United States Patent [19]

Chen et al.

[11] Patent Number: 5,763,530
[45] Date of Patent: Jun. 9, 1998

US005763530A

[54] STABLE EMULSION BLENDS AND METHODS FOR THEIR USE

[75] Inventors: Haunn-Lin Chen, Darien; Richard F. Rice, Stamford, both of Conn.; Louis Rosati, South Salem, N.Y.; Paul S. Waterman, Shelton, Conn.

[73] Assignee: Cytec Technology Corp., Wilmington, Del.

[21] Appl. No.: 747,483

[22] Filed: Nov. 12, 1996

Related U.S. Application Data

[63] Continuation of Ser. No. 454,773, May 31, 1995, abandoned, which is a continuation of Ser. No. 408,743, Mar. 22, 1995, abandoned, which is a division of Ser. No. 157,795, Nov. 24, 1993, abandoned.

[51] Int. Cl.$^6$ .............................. C08F 120/60; C08K 5/08
[52] U.S. Cl. .......................... 524/521; 524/211; 524/358; 524/501; 524/555; 524/922; 526/307; 526/307.2
[58] Field of Search ................................ 524/521, 358, 524/211, 555, 501, 922; 526/307, 307.2

[56] References Cited

U.S. PATENT DOCUMENTS

| | | | |
|---|---|---|---|
| 3,284,393 | 11/1966 | Vanderhoff et al. | 260/29.6 |
| 3,979,348 | 9/1976 | Ballweber et al. | 260/29.4 |
| 3,988,277 | 10/1976 | Witschonke et al. | 260/29.6 |
| 4,010,131 | 3/1977 | Phillips et al. | 260/29.4 |
| 4,052,535 | 10/1977 | Robinson et al. | 429/104 |
| 4,073,763 | 2/1978 | Tai | 260/29.4 |
| 4,113,685 | 9/1978 | Hubner et al. | 260/29.4 |
| 4,120,840 | 10/1978 | Hurlock et al. | 260/29.4 |
| 4,146,499 | 3/1979 | Rosano | 252/186 |
| 4,179,370 | 12/1979 | Hubner et al. | 210/51 |
| 4,182,699 | 1/1980 | Fan | 524/516 |
| 4,195,003 | 3/1980 | Hurlock et al. | 260/29.4 |
| 4,230,608 | 10/1980 | Mura | 260/29.4 |
| 4,251,410 | 2/1981 | Danner et al. | 260/29.4 |
| 4,384,056 | 5/1983 | Schmidt et al. | 523/221 |
| 4,390,659 | 6/1983 | Stanley, Jr. et al. | 524/555 |
| 4,395,500 | 7/1983 | Lohr et al. | 523/221 |
| 4,464,508 | 8/1984 | Easterly, Jr. | 524/787 |
| 4,521,317 | 6/1985 | Candau et al. | 252/8.55 |
| 4,565,836 | 1/1986 | Emerson et al. | 523/346 |
| 4,619,967 | 10/1986 | Emerson et al. | 524/801 |
| 4,640,954 | 2/1987 | Schnee et al. | 524/516 |
| 4,681,912 | 7/1987 | Durand et al. | 524/827 |
| 4,824,877 | 4/1989 | Glover et al. | 523/221 |
| 4,916,182 | 4/1990 | Azzam | 524/501 |
| 4,954,538 | 9/1990 | Dauplaise et al. | 523/223 |
| 4,956,399 | 9/1990 | Kozakiewicz et al. | 523/223 |
| 4,956,400 | 9/1990 | Kozakiewicz et al. | 523/223 |
| 5,037,863 | 8/1991 | Kozakiewicz et al. | 523/223 |
| 5,037,881 | 8/1991 | Kozakiewicz et al. | 524/812 |
| 5,070,133 | 12/1991 | Miyajima | 524/501 |
| 5,109,062 | 4/1992 | Robinson et al. | 524/801 |
| 5,132,023 | 7/1992 | Kozakiewicz et al. | 210/734 |
| 5,151,195 | 9/1992 | Buriks et al. | 210/705 |

FOREIGN PATENT DOCUMENTS

| | | |
|---|---|---|
| 1 204 535 | 1/1982 | Canada . |
| 0 327 321 | 2/1889 | European Pat. Off. . |
| 0 041 125 | 4/1981 | European Pat. Off. . |
| 49-074730 | 7/1974 | Japan . |
| 57-063200A | 4/1982 | Japan . |
| 57-63200 | 4/1982 | Japan . |
| 62-50120 | 3/1987 | Japan ................... B01J 13/00 |
| 63-218246 | 9/1988 | Japan . |
| 0616951 | 4/1980 | Switzerland ............... 210/734 |
| 1489046 | 10/1977 | United Kingdom . |

OTHER PUBLICATIONS

U.S. Patent Application: Cicchiello etal, Title: Multimodal Emulsions and Process for Preparing Multimodal Emulsions, filed Nov. 24,1993, Serial No. 08/157,764.

U.S. Patent Application: Sun Yi Huang etal, Title: Quaternized Tertiary Aminomethyl Acrylamide Polymer Microemulsions with Improved Performance, filed Feb. 12, 1993, Serial No. 08/018,858.

*Primary Examiner*—Andrew E. C. Merriam
*Attorney, Agent, or Firm*—Claire M. Schultz

[57] ABSTRACT

Stable compositions comprising a blend of at least two inverse emulsions, at least one of which is a polymeric microemulsion, provide effective flocculating performance over time. Methods for preparing stable emulsion blends use stabilizing amounts of aldehyde scavenger.

33 Claims, No Drawings

STABLE EMULSION BLENDS AND METHODS FOR THEIR USE

This is a continuation of U.S. application(s) Ser. No. 08/454,773, filed on May 31, 1995, now abandoned, which in turn is a continuation of Ser. No. 08/408,743, now abandoned, filed Mar. 22, 1995, in turn which is a divisional of Ser. No. 08/157,795, filed on Nov. 24, 1993, now abandoned.

This invention relates to stabilized compositions comprising blends of at least one microemulsion with a second emulsion and methods for their use.

BACKGROUND OF THE INVENTION

Flocculants facilitate the agglomeration of solids suspended in a liquid medium, usually aqueous, to form a distinct entity capable of being separated. The use and development of synthetic polymers as flocculants has progressed and evolved since their introduction in the 1950's. Since then, there has been a continual need for polymers with greater performance, longer term stability, and less sensitivity to variations in temperature and alkalinity.

Significant advancements in the development of polymers useful in flocculant applications are disclosed in commonly assigned U.S. Pat. Nos. 4,956,399; 4,956,400; 5,037,863; 5,132,023 and 5,037,881. In those patents, Mannich (alk) acrylamide polymers are prepared in the form of inverse microemulsions which mitigate the adverse effects of crosslinking and provide superior flocculating performance. In contrast to solution and inverse macroemulsion Mannich acrylamide polymers of the art at that time, which contained large quantities of polymer molecules in the same aqueous environment and which may tend to crosslink through inter or intramolecular reactions after relatively short periods of time, the Mannich acrylamide polymers in a microemulsion are isolated as individual, or at most, several, polymer molecules in each aqueous microemulsion micelle or droplet. Thus, as a result of the smaller arena and quantity of polymer therein any problem of large scale debilitating interpolymer crosslinking inherent in solution and inverse macroemulsion products was overcome, if not reduced. Furthermore, the microemulsion produced Mannich acrylamide polymers could be prepared at higher solid levels than the solution and inverse macroemulsion polymers, yet still maintain low bulk viscosities.

The microemulsion formed Mannich acrylamide polymers described above were then further improved by a method of heat treating the polymeric emulsion as disclosed in U.S. patent application Ser. No. 08/018,858, filed Feb. 12, 1993. More specifically, quaternary dialkyl aminomethyl (Mannich) acrylamide polymeric (PAM) microemulsions were treated with a formaldehyde scavenger under aqueous acidic conditions (pH ranging from about 3.6 to 4.8) and then heated to a temperature ranging from about 40° to 80° C. for from about 3 to 20 hours. This heat treatment solved problems associated with inversion and aging. By rendering the polymers less dependent to pH and temperature, the heat treatment improved the performance and efficiency of the polymers as flocculating agents and extended the shelf life and stability of the quaternized Mannich PAM.

Consequently, when heat treated quaternized Mannich PAM microemulsions were blended with a second macroemulsion to produce a low viscosity multimodal emulsion according to U.S. patent application Ser. No. 08/157,764 (Attorney Docket No.: 93,084) filed on Nov. 24, 1993 by the same applicant concurrently herewith, it was expected that the resulting multimodal emulsion would continue to exhibit the inversion and long term stability benefits exhibited by the heat treated quaternized Mannich PAM microemulsion. The combination of a stabilized quaternized Mannich PAM microemulsion with a stable polymeric macroemulsion, however, resulted in a low viscosity multimodal emulsion which, though initially stable, tended to deteriorate in performance over time. This problem confounded those who worked with multimodal emulsion blends made from quaternized Mannich PAM microemulsions and it contradicted teachings in the art. For example, Japanese patent application 63-218246 discloses a mixture of an anionic polymer emulsion with a cationic polymer emulsion to produce an amphoteric polymer emulsion. The cationic polymeric emulsion may contain, among many acrylamide-based polymers, a Mannich modification product. While no stabilizer is added and no pH adjustments are made, the resulting amphoteric polymer emulsion was reported to exhibit "excellent stability over time". This result was not found, however, when certain polymer microemulsions such as Mannich (alk)acrylamide polymeric microemulsions were blended with emulsions comprising acrylamide-based polymers, as in the present invention.

U.S. Pat. Nos. 4,619,967 and 4,565,836 teach that multimodal emulsions (i.e., emulsions having two identifiable and distinct aqueous droplet size distributions) made from applying various shear rates to a standard inverse macroemulsion not only exhibit a low viscosity, but invert quickly and can be stored for substantial periods of time without losing stability. However, the patentee's multimodal emulsions, could not contain two different polymers and are not made from blending an emulsion with a microemulsion, including microemulsions that contain quaternized Mannich PAMs, to form a multimodal emulsion.

The blending of certain microemulsions, such as quaternized Mannich Pam microemulsions and the like, with one or more second emulsion to form multimodal emulsions or emulsion blends posed a unique problem.

Though the applicant is not to be bound by any scientific theory described herein, it has been deduced that, when an inverse microemulsion containing a functionalized polymer, preferably a quaternized Mannich PAM, is blended with a second emulsion, compounds such as aldehydes within the functionalized polymer-containing microemulsion, (e.g. a Mannich PAM microemulsion), surprisingly migrate to the aqueous phase of the second emulsion where they may react with the (alk)acrylamide polymer therein. The addition of an aldehyde scavenger to the emulsion blend has been found to provide for longer term stability. No heating or alkalinity adjustments are necessary for attaining a stable emulsion blend.

It is further surprising that the stable compositions of the present invention, which comprise a blend of at least two emulsions, may be prepared from a second emulsion containing an (alk)acrylamide-based polymer and a microemulsion containing a quaternary Mannich (alk)acrylamide which has not been previously heat treated with a formaldehyde scavenger under acid conditions and heating as taught in U.S. patent application Ser. No. 08/018,858, filed Feb. 12, 1993. Instead, a blend of such two emulsions may be stabilized by the addition of a blend stabilizing amount of aldehyde scavenger according to the instant invention.

The use of functionalized polymers, as defined herein, in microemulsion form reduce, if not overcome, problems of large scale debilitating cross-linking which is inherently observed when such functionalized polymers are in solution form or inverse macroemulsion form. Consequently, the functionalized polymer, maintain superior performance as effective flocculants in dewatering suspended solids. These benefits are also provided by the stable emulsion blends of the present invention.

In this regard, the stable emulsions of the instant invention often exhibit superior performance in various flocculation applications in comparison to the singular use of either of the emulsions used to prepare the stable emulsion blend. Further, the stable emulsion blends having a cationic (or anionic) charge often perform better than similar polymeric microemulsions or macroemulsions in the art having the same charge.

The stable emulsions of the present invention are useful in a wide range of solid-liquid separation operations. Particularly, those emulsion blends having a cationic charge may be used in the dewatering of biologically treated suspensions, such as sewage and other municipal or industrial sludges, the drainage of cellulosic e.g.,paper making uses such as retention aids and in the treatment of paper waste and settlement of various suspensions, e.g., refinery waste, food waste, etc.

SUMMARY OF THE INVENTION

In accordance with the present invention there is provided a stable composition comprising a blend of at least two inverse (water-in-oil) emulsions wherein at least one of said two emulsions is a microemulsion which contains in its discontinuous phase a functionalized water-swellable, preferably water-soluble polymer, and the second of said two emulsions in said blend contains a water-swellable, preferably, water-soluble (alk)acrylamide-based polymer and a blend stabilizing amount of an aldehyde scavenger. Preferably the functionalized water-soluble polymer in the microemulsion is a dialkyl aminomethyl (alk)acrylamide polymer and more preferably a quaternary dialkyl aminomethyl (alk)acrylamide polymer. The water-swellable or water-soluble (alk)acrylamide-based polymer in the second emulsion is preferably a polymer containing monomeric units selected from quaternary dialkyl aminomethyl (alk) acrylamide; dialkyl aminomethyl (alk)acrylamide; quaternary dialkylaminoalkyl (meth)acrylamides, dialkylaminoalkyl (meth)acrylamide; acrylamido-2-alkyl sulfonic acid or copolymers of acrylamide or (meth)acrylamide with any of the aforesaid monomeric units or a monomer selected from quaternary dialkylaminoalkyl (meth)acrylates; N,N,-dialkylaminoalkyl (alk)acrylates; quaternized alkyl (amyl) halides; diallyidialkylammonium halides; and (meth)acrylic acid acrylic acid and salts thereof.

The second inverse emulsion may be a macroemulsion or a microemulsion. The microemulsions, macroemulsions and second emulsions referred to herein are inverse emulsions. Preferably the second emulsion is a macroemulsion. Since a macroemulsion has a different aqueous droplet size distribution than a microemulsion, (droplet size distribution being represented herein by a volume average droplet diameter) when the two emulsions having two different droplet sizes are combined, a bimodal or multimodal (collectively referred to herein as "multimodal") emulsion having lower bulk viscosity is produced. The advantages provided by such multimodal emulsions in various flocculation applications and for paper making are disclosed in commonly assigned U.S. patent application Ser. No. 08/157,764, filed Nov. 24, 1993 (Attorney Docket No.: 93,084) which has been concurrently filed with the present application and which is incorporated herein by reference.

Also provided by the instant invention are processes for preparing the stable emulsions disclosed herein and various methods for flocculating suspended solids from aqueous dispersions using the stable emulsions of the present invention.

DETAILED DESCRIPTION OF THE INVENTION

In a broad sense, the stabilized compositions of the present invention are blended from at least one inverse microemulsion comprising a functionalized water-swellable, preferably water-soluble polymer and a second inverse emulsion comprising a water-swellable, preferably water-soluble polymer which is capable of reacting with any type of aldehyde, and a blend stabilizing amount of aldehyde scavenger. The polymers capable of reacting with an aldehyde are generally water-swellable, preferably water-soluble, (alk)acrylamide-based polymers.

For purposes of defining the invention herein, the functionalized polymers employed in the microemulsions used to prepare the stable compositions of the present invention are generally defined as any (alk)acrylamide-based polymer which contains, generates or is capable of generating a compound capable of reacting with the (alk)acrylamide-based polymer in the second emulsion. Particularly included within this definition of functionalized polymer is any (alk)acrylamide-based polymer that contains, generates or is capable of generating any amount of aldehyde such as formaldehyde, acetaldehyde, glyoxal or higher aldehydes. These aldehydes can react with the (alk)acrylamide-based polymer in the second emulsion. Typically, such aldehyde compounds may arise from residual unreacted aldehyde or be generated, for example, during the preparation of the functionalized polymer in the microemulsion, which includes polymerization and any subsequent reactions such as a Mannich reaction or glyoxalation. The functionalized polymers should be water-swellable, preferably water-soluble. Functionalized polymers preferably include quaternized Mannich PAMs, Mannich PAMs and glyoxalated poly(alk)acrylamide (PAM) and variations of such polymers where the Mannich or glyoxalation reactions on the (alk) acrylamide backbone are run at less than 100 percent substitution. Methods of doing this are disclosed in U.S. patent Ser. No. 08/018,858, filed Feb. 12, 1993 and U.S. Pat. Nos. 4,956,399 and 4,956,400, the disclosures of which are incorporated by reference. Quaternary Mannich PAMs such as quaternary N,N,N-trimethylaminomethylacrylamide are generally preferred, more preferably quaternary Mannich PAMs containing from about 20 to about 100 mole percent, more preferably from 60 to 90 mole percent cationic functionality, based on the monomer, are most preferred.

It is generally preferred that the Mannich PAM be substituted with at least about 1 mole percent of tertiary aminomethyl groups and that the glyoxalated PAMs be substituted with at least about 0.5 weight percent, preferably 1.0 weight percent and most preferably 5.0 weight percent glyoxal groups. The backbone of the Mannich and glyoxalated PAMs used in the present invention may comprise units of (alk)acrylamide such as acrylamide, methacrylamide, ethacrylamide and the like. The backbones of the Mannich and glyoxalated (alk)acrylamide polymers may also comprise an (alk)acrylamide copolymerized with the any of the various water-soluble ethylenically unsaturated cationic or nonionic comonomers described below in amounts up to about 90 percent and still be considered a functionalized polymer. Water-soluble anionic comonomers, also described below, may also be used in lower amounts.

Suitable cationic comonomers for preparing functionalized polymers for use in the microemulsions include dialkylaminoalkyl (meth)acrylates and dialkylaminoalkyl (meth) acrylamides, including their acid addition or quaternary ammonium salts, diallyl dialkyl ammonium halides and vinyl benzyltrialkyl ammonium salts.

Preferred anionic comonomers for use in preparing the functionalized polymers used in the present invention generally are vinyl anionic monomers and include acrylic acid, methacrylic acid, ethacrylic acid, fumaric acid, crotonic acid, maleic acid and satls thereof; vinyl sulfonic acid, 2-acrylamido-2-alkylsulfonic acids where the alkyl group contains 1 to 6 carbon atoms, such as 2-acrylamido 2-methyl-1-propanesulfonic acid, styrene sulfonic acid or mixtures of any of the foregoing and their salts.

The preferred ethylenically unsaturated nonionic monomers for use in the preparation of the functionalized polymers used in the present invention are selected from acrylamide; methacrylamide; dialkylaminomethyl acrylamides; N,N-dialkylmethacrylamides; N-alkylacrylamides; N-vinylpyrrolidone, hydroxyalkyl methacrylates; N-vinylacetamide; N-vinylformamide and the like and mixtures thereof. Especially preferred is acrylamide and (meth) acrylamide.

Small amounts of hydrophobic comonomers can be included in the polymers employed in the microemulsions or second emulsions used in this invention such as styrene, methylmethacrylate, methylacrylates, (meth)acrylate esters containing 1–16 carbons, vinyl acetate and higher esters, acrylonitrile, vinyl chloride and the like. It is understood that the present invention is not limited to the description of monomers, comonomers, polymers and copolymers herein.

The (alk)acrylamide-based polymers employed in the second emulsions are formed by emulsion polymerization of water-soluble (alk)acrylamide or (alk)acrylamide-based monomers optionally polymerized with comonomers. Suitable water soluble monomers for preparing such polymers include (alk)acrylamide such as acrylamide, (meth) acrylamide, ethacrylamide and the like; quaternary dialkyl aminomethyl(alk)acrylamide; dialkyl aminomethyl (alk) acrylamide; quaternary dialkylaminoalkyl (meth) acrylamides; dialkylaminoalkyl (meth)acrylamide and copolymers of acrylamide or methacrylamide with any of the aforesaid monomeric units or a monomeric unit selected from dialkylaminoalkyl (meth)acrylates, quaternary dialkylaminoalkyl (meth)acrylates, diallyldialkylammonium halides, acrylamido-alkyl sulfonic acid and its salts such as 2-acrylamido-2-methyl-1-propanesulfonic acid and (meth) acrylic acid. The aforesaid monomers may be homopolymerized or copolymerized and subsequent reactions therein known in the art such as aminomethylation (Mannich) reactions or glyoxation can be performed. Any of the aforesaid monomers may be copolymerized with any of the various water-soluble ethylenically unsaturated cationic or nonionic or anionic comonomers described above. The aforesaid monomers may be copolymerized with small amounts of hydrophobic monomers. The (alk)acrylamide-based polymers in the second emulsion may therefore be cationic, anionic or nonionic in charge. Homopolymers of 2 acrylamido-2-alkylsulfonic acids, quaternary dialkyl aminomethyl(alk)acrylamide; dialkyl aminomethyl (alk) acrylamide; quaternary dialkylaminoalkyl (meth) acrylamides; dialkylaminoalkyl (meth)acrylamide and copolymers of acrylamide or methacrylamide with any of the aforesaid monomeric units or a monomeric unit selected from dialkylamino alkyl (meth)acrylates quaternary dialkylaminoalkyl (meth)acrylates, diallyidialkylammonium halides, (meth)acrylic acid and acrylamido-alkyl-sulfonic acid and their saltsare preferably employed in the second emulsion. Cationic copolymers of acrylamide and (alk) acryloyloxyethytrimethylammonium salts, which includes halides and sulfates are more preferred for inclusion in the second emulsion. The amount of cationic functionality in cationic polymers used for the second emulsion may be varied, preferably between 1 and 60 mole percent functionality, based on the monomer. More preferably, such cationic copolymers contain about 1 to about 20 mole percent cationic functionality, based on the monomer. The (alk)acrylamide-based polymers should be water-swellable, preferably water-soluble.

In combining a microemulsion containing a functionalized polymer with a second emulsion containing an (alk) acrylamide-based polymer, the preferred polymer combinations will vary according to the substrate to be treated and the application for which the resulting stabilized emulsion is used. For example, it is preferred to combine a polymeric microemulsion comprising quaternized Mannich acrylamide, with a cationic polymeric macroemulsion, preferably a macroemulsion comprising (meth) acryloxyethyltrimethylammonium salts or copolymers of acrylamide and (meth)acryloxyethyltrimethylammonium salts to form a low viscosity bimodal emulsion for use in flocculating suspended solids in municipal sludge. To treat a sludge from coal refuse it would be preferable to combine a microemulsion comprising an anionic functionalized polymer with a macroemulsion comprising an anionic alk-acrylamide-based polymer.

The ionic functionalized and (alk)acrylamide-based polymers used in the microemulsion and second emulsion may also differ in charge. For instance, the polymers can have a wide range of charge densities, from just a few mole percent cationic or anionic functionality up to 100 mole percent of cationic or anionic functionality, based on the monomer. A cationic quarternary Mannich PAM contained within the microemulsion may, for example, be blended with a second emulsion, preferably a macroemulsion, containing an anionic (alk)acrylamide-based polymer.

The molecular weights of the polymers used in the microemulsion and second emulsion are not critical to the invention and can range from a few hundred thousand to over ten million. When a high molecular weight polymer and a low molecular weight polymer combination is desired however, it is preferred to employ the high molecular weight polymer in the microemulsion and the low molecular weight polymer in the second emulsion, particularly when the second emulsion is a macroemulsion. The art recognizes that for many flocculation applications for which the emulsion blends are useful, the activity of the polymers is affected by molecular weight.

When a microemulsion is combined with at least one second emulsion the proportions in which the emulsions are combined is not critical. Generally, at least 1 percent microemulsion(s) should be combined with at least 1 percent second emulsion(s). Preferably the two or more emulsions may be combined in any proportions ranging from 99 to 1 part microemulsion to second emulsion to 1 to 99 parts microemulsion to second emulsion; more preferably the ratio of microemulsion to second emulsion ranges from 95 to 5 parts microemulsion to second emulsion to 5 to 95 parts microemulsion to second emulsion. The proportions may vary depending on the charge of the microemulsion and second emulsion used to prepare the stable emulsion blend and the desired overall charge of the emulsion blend. If a multimodal emulsion is desired, it is important that the second emulsion be a macroemulsion or a microemulsion which comprises droplets, preferably aqueous, having a volume average diameter which is greater than, generaly at least 150 Å greater, preferably at least 300 Å greater than, more preferably at least 1000 Å greater than and most preferably at least 2000 Å greater than the volume average diameter of the droplets in the microemulsion.

The term "aldehyde scavenger", as used herein, means and includes those compounds, preferably water-soluble compounds, which have the capability of reacting with any aldehyde, such as formaldehyde, acetaldehyde, glyoxal, and the like, though preferably formaldehyde. Such aldehyde compounds are present in or generated from the microemulsion which is blended with the second emulsion to produce the stabilized composition and they result, in theory, from unreacted aldehyde or from components that release aldehyde. Suitable aldehyde scavengers include those known in the art, and include, but are not limited to, urea, substituted ureas, such as ethylene urea, guanidine salts, dicyanamide, dimedone (5,5-dimethyl-1,3-cyclohexanedione), 2-imidazolidone, methylacetoacetate malonamide, sulfurous acid and any of its alkali metal salts such as sodium bisulfite, sodium metabisulfite and the like, as well as phosphorous acid, and mixtures of any of the foregoing. Urea, substituted ureas and dimedone and mixtures thereof are preferred.

"Blend stabilizing amount" generally refers to the amount of aldehyde scavenger necessary for stabilizing the blend, i.e. maintaining performance of the polymer activity in the emulsion blend. Preferably, "blend stabilizing amount" means the amount of aldehyde scavenger necessary for reducing polymer degradation (e.g. through cross-linking or otherwise), primarily the (alk)acrylamide-based polymer. This amount is provided by adding from about 0.1 to about 10 weight percent aldehyde scavenger, based on the total weight of the composition, to the emulsion blend. The three methods of adding the aldehyde scavenger to the blend are described below. The quantity of aldehyde scavenger used in the present invention may generally be as low as about 0.1 weight percent, based on the weight of the stabilized composition, preferably at least about 0.7 weight percent, based on the weight of the stabilized composition. Generally amounts ranging up to about 10.0 weight percent, preferably up to 5.0 weight percent, based on the weight of the stabilized composition, may be used. While higher amounts of aldehyde scavenger are also effective, such amounts are usually less desirable since the benefits are usually offset by cost considerations. Blend stabilizing amounts of aldehyde scavenger used in the present invention preferably range from about 0.7 to about 5.0 weight percent, based on the total weight of the stabilized composition. However, these amounts may vary as discussed below, depending upon the microemulsion used. The blend stabilizing amount of aldehyde scavenger may be added neat or it may be added as an aqueous solution, usually about a 40 to 60 weight percent solution.

The stabilized compositions of the present invention, which comprise a blend of at least two emulsions, may be prepared by three different methods. They are prepared by:

(a) preparing an inverse microemulsion containing a water-swellable or water-soluble functionalized polymer;

(b) preparing a second emulsion containing a water-swellable or water-soluble (alk)acrylamide-based polymer;

(c) admixing the microemulsion and the second emulsion to form a blend of emulsions; and (d) adding a blend stabilizing amount of aldehyde scavenger to the emulsion blend.

Alternatively, instead of adding the aldehyde scavenger to the emulsion blend, the stabilized compositions of the present inventions may be prepared by:

(a) preparing an inverse microemulsion comprising a water-swellable or water-soluble functionalized polymer;

(b) preparing a second emulsion comprising a water-swellable or water-soluble (alk)acrylamide-based polymer and a blend stabilizing amount of aldehyde scavenger; and (c) admixing the microemulsion and the second emulsion.

A third method of preparing the stable compositions of the present invention is by:

(a) preparing an inverse microemulsion comprising a water-swellable or water-soluble functionalized polymer;

(b) preparing a second emulsion comprising a water-swellable or water-soluble (alk)acrylamide-based polymer;

(c) adding a blend stabilizing amount of aldehyde scavenger compound to the microemulsion resulting from step (a).

(d) admixing the microemulsion resulting from step (c) and second emulsion to form a blend of emulsions.

It is preferred to add the aldehyde scavenger to the second emulsion, particularly if it is a macroemulsion, and then admix the microemulsion thereto. While a blend stabilizing amount of aldehyde scavenger may be added to the second emulsion at any stage, it is preferred to add it to the aqueous monomer phase of the second emulsion before polymerization for manufacturing and handling reasons and to maximize the solids content. In contrast, while a blend stabilizing amount of aldehyde scavenger may be added to the functionalized polymer-containing microemulsion prior to blending, the aldehyde scavenger should not be added to the aqueous monomer phase of the microemulsion, but must be added to the microemulsion after it has been prepared and functionalized. This is to assure that sufficient aldehyde scavenger enters the droplets of the second inverse emulsion for stabilization.

It is also preferred to heat treat as disclosed in U.S. application Ser. No. 08/018,858 the microemulsion containing the functionalized water-swellable or water-soluble polymer before mixing with the second emulsion and to add a blend stabilizing amount of aldehyde scavenger to the emulsion blend, preferably to the macroemulsion prior to blending. The method of heat treating, described below, involves the addition of an acid to adjust the pH to about 3.6 to 4.8 and a formaldehyde scavenger and heating the microemulsion to a temperature within a range from about 400° to 80° C. for about 3 to 20 hours. The amount of formaldehyde scavenger that is added to the microemulsion in this heat treating step may alter the stabilizing amount of aldehyde scavenger that is added to the second emulsion or the emulsion blend.

While heating and adjusting the pH of the microemulsion is critical to heat treating the microemulsion, the present method of preparing the stabilized blend of emulsions does not require heating or pH adjustments. Generally and preferably, the microemulsion, which is optionally heat treated, is simply mixed with the second emulsion containing a blend stabilizing amount of aldehyde scavenger at ambient temperature and with modest mixing. Less preferably, the aldehyde scavenger may be added to the blend of the microemulsion and second emulsion or to the microemulsion prior to blending at ambient temperatures and with modest mixing conditions. The above procedure applies regardless of whether the second emulsion is a macroemulsion or a microemulsion.

The art recognizes that certain aldehyde scavengers may not be effective at certain pH's, i.e., that they do not react with formaldehyde, and therefore, even though the stabilization method of the instant invention does not necessitate any specific pH range, it is important that the particular aldehyde scavenger used to prepare the stable emulsion blend be effective at the pH of the emulsion blend. Thus, pH adjustments may be made, based on the known chemistry of the aldehyde scavenger used. For example, urea is known to be less reactive with formaldehyde at alkalinity levels above a pH of 7, so it would be preferred to adjust the pH of the emulsion blend to a pH ranging from 6 to 2. Similarly, pH adjustments may be necessitated by the known chemistry of the particular (alk)acrylamide-based polymer used in the microemulsion or second emulsion. Any such pH adjustments may be made based on knowledge in the art and with routine experimentation, if necessary.

A microemulsion, for purposes of this invention, is generally defined as a thermodynamically stable composition comprising two liquids or phases which are insoluble in each other along with a surfactant or surfactant mixture. Polymeric inverse microemulsions which contain a continuous oil phase and a polymer-containing discontinuous phase (usually aqueous) are prepared from thermodynamically stabile monomer microemulsions. Inverse microemulsions have a narrow droplet size distribution and are usually, but not always, optically transparent. The discontinuous polymer-containing phase of microemulsions form droplets or micelles, which are usually aqueous and usually have a volume average droplet diameter which is less than about 2500 Å, preferably less than about 2000 Å and most preferably less than about 1000 Å. Some microemulsions may have a volume average droplet diameter as large as about 3000 Å. While there are many known methods of determining the volume average diameter, as the term is used herein, volume average droplet diameter is a value obtained by transmission electron microscopy using the following equation, as applied to a count of droplets which is sufficient to attain an accurate statistical representation of the droplet size distribution:

$$V_a = \sqrt[3]{\frac{\Sigma X_i^3}{\Sigma N_i}}$$

Wherein:
$X_i$=the diameter value
$N_i$=the number of droplets of each diameter value
$V_a$=volume average droplet diameter The second inverse emulsion used to prepare the compositions of the present invention is defined as an emulsion which may be a microemulsion or a macroemulsion containing a continuous oil phase and a discontinuous phase, which is in the form of droplets or micelles that are preferably aqueous, and surfactant.

The term macroemulsion as used herein is defined as an emulsion which is not thermodynamically stable and which comprises two liquids or phases which are insoluble in each other along with surfactant or emulsifier; the macroemulsions used in this invention comprise a discontinuous polymer-containing phase, preferably aqueous, in the form of droplets or micelles.

When the second emulsion is a macroemulsion, it may be formed by conventional macroemulsion polymerization methods. If it is desirable that the second emulsion be a microemulsion, it may be prepared by microemulsion polymerization technique as described below. If a low viscosity multimodal emulsion blend is desired, the second emulsion is preferably a macroemulsion or it may be a microemulsion provided that the its discontinuous phase droplets, preferably aqueous, have a volume average diameter which is greater, generally at least about 150 Å greater, preferably 300 Å greater, more preferably 1000 Å greater and most preferably at least about 2000 Å greater than the volume average diameter of the droplets in the microemulsion with which it is blended.

The microemulsions used for preparing the stabilized compositions of the present invention comprise a continuous oil phase, which generally includes a water-immiscible inert organic liquid and a surfactant or surfactant mixture, and a discontinuous phase, preferably aqueous, which forms droplets containing a water-swellable, preferably water-soluble polymer. The ratio of the aqueous phase to the oil phase should be as high as possible. Normally, it is such that the aqueous phase makes up from about 0.5 to about 3:1 part oil phase. Preferably the ratio approximates 1:1. Most preferably, the microemulsion comprises from about 1 to about 50% weight percent aqueous phase, based on the total weight of the microemulsion. The amount of polymer contained within the discontinuous phase of the microemulsions should also be as high as possible but can generally range from about a few percent up to about 100, weight percent, based on the total weight of discontinuous phase. The discontinuous aqueous phase may, therefore, contain 100% polymer and 0% water and are prepared using known methods in the art. The term "aqueous droplet" used herein includes droplets containing amounts of up to 100% polymer.

The polymers employed in the microemulsions used to prepare the stable compositions described herein are formed by microemulsion polymerization of certain water-soluble ethylenically unsaturated monomers or blend of monomers. Conventional microemulsion polymerization techniques as disclosed in, for example, U.S. Pat. Nos. 5,037,881; 5,037, 863; 4,681,912 and 4,521,317, the disclosures of each of which are incorporated herein by reference, may be employed.

Generally, microemulsion polymerization is produced by (i) preparing a monomer containing microemulsion by mixing an aqueous solution of monomers with a hydrocarbon liquid containing an appropriate amount of surfactant or surfactant mixture to form an inverse microemulsion comprising small aqueous droplets dispersed in a continuous oil phase and (ii) subjecting the monomer-containing microemulsion to polymerization conditions. It is not necessary to apply energy, e.g., apply shear, into the emulsion to obtain the small aqueous droplets, although a microemulsion prepared as disclosed herein, which is also is subject to shear is not beyond the scope of this invention.

The formation of the inverse microemulsion depends on the proper selection of surfactant concentration and the hydrophilic-lypophylic balance (HLB) of the surfact or surfactant mixture. Temperature, nature of the oil phase and composition of the aqueous phase will also affect inverse microemulsion formation.

The one or more surfactants selected should provide an HLB value ranging from about 8 to about 12. The required HLB may vary from this, depending on the nature of the monomers, the nature and proportion of comonomer (if any) and the nature of the oil phase. In addition to the appropriate HLB range, the surfactant concentration must be sufficient to form an inverse microemulsion. Too low surfactant concentrations will not result in the formation of a microemulsion, while excessively high concentrations will increase costs without imparting significant benefit. For example, the minimum amount of sufactant for forming an inverse microemulsion containing anionic polymer will vary depending on the HLB of the surfactant system used; such minimum surfactant amount, based on total weight, is depicted by the hachured portion within the curve representing surfactant concentration verses HLB value in the sole FIGURE in U.S. Pat. No. 4,681,912, see the FIGURE and column 3 lines 22–37 therein. Typical surfactants useful in preparing the microemulsion for the present invention include anionic, cationic and nonionic surfactants. Preferred surfactants include polyoxyethylene sorbitol fatty acids, sorbitan sesquioleate, polyoxyethylene sorbitan trioleate, sorbitan monooleate, polyoxyethylene (20) sorbitan monooleate, sodium dioctylsulfosuccinate, oleamidopropyldimethyl amine, sodium isostearyl-2-lactate, polyoxyethylene sorbitol monooleate or mixtures thereof and the like.

The selection of the organic phase has a substantial effect on the minimum surfactant concentration necessary to obtain the inverse microemulsion and may consist of hydrocarbons or hydrocarbon mixtures. Isoparafinic hydrocarbons or mixtures thereof are most desirable in order to obtain inexpensive formulations. Typically the organic phase will comprise mineral oil, toluene, fuel oil, kerosene, odorless mineral spirits, mixtures of any of the foregoing and the like.

Polymerization of the microemulsion may be carried out in any manner known to those skilled in the art. Initiation may be effected with a variety of thermal and redox free radical initiators, including peroxides, e.g. t-butyl hydroperoxide; azo compounds, e.g. azobisisobutyronitrile; inorganic compounds, such as potassium per sulfate and redox couples, such as ferrous ammonium sulfate/ammonium persulfate. Initiator addition may be effected any time prior to the actual polymerization per se. Polymerization may also be effected by photochemical irradiation processes, such as ultraviolet irradiation or by ionizing irradiation from a cobalt 60 source.

Typically the surfactant and oil are pre-mixed and added to an aqueous solution which contains the monomers and optional comonomers as defined above and any conventional additive such as, but not limited to, chelating agents such as ethylenediaminetetraacetic acid, difunctional monomers such as methylene bis(acrylamide), pH adjusters, initiators and the like. Once the aqueous and oil solutions are combined, an inverse microemulsion forms, without the need for shearing.

In a preferred embodiment of the present invention, a microemulsion comprising a dialkyl amino methyl (Mannich) acrylamide or its quaternary derivative such as the functionalized water-swellable, preferably water-soluble, polymer, more preferably an acrylamide polymer substituted with at least about 1 mole percent of tertiary amino methyl groups which is optionally but preferably quaternized, is prepared for blending with a second emulsion comprising any water-swellable, preferably water-soluble, (alk)acrylamide-based polymer and a blend stabilizing amount of aldehyde scavenger. Preferably, the second emulsion is a macroemulsion and the aldehyde scavenger is added to the macroemulsion. Preferred (alk)acrylamide-based polymers suitable for use in the second emulsion include all cationic (alk)acrylamide-based polymers and, preferably, cationic polymers containing monomeric units selected from quaternary dialkyl aminomethyl (alk) acrylamide; dialkyl aminomethyl (alk)acrylamide; quaternary dialkylaminoalkyl (meth)acrylamides; dialkyl aminoalkyl (meth)acrylamides and copolymers of acrylamide or methacrylamide with any of the aforesaid monomers or a monomer selected from tertiary or quaternary dialkylaminoalkyl (meth)acrylates, dialkylaminoalkyl (meth)acrylates and diallyidialkylammonium halides. Among these, copolymers of (alk)acrylamide and quaternary dialkyl aminoalkyl (meth)acrylates are particularly preferred and copolymers of acrylamide and acryloxyethyltrimethylammonium halide are most preferred, particularly those having a 1 to 60 mole percent cationic functionality, based on the monomer. Optionally, a difunctional monomer such as methylene bisacrylamide or the like may be incorporated into the monomer solution prior to polymerization. Any (alk) acrylamide-based cationic polymer containing about 1–60 mole percent, most preferably 1–20 mole percent cationic functionality, based on monomer, may be employed in the second emulsion. Microemulsions containing quaternized Mannich PAM or Mannich PAM, preferably containing from about 20 to about 100 mole percent cationic functionality, based on the monomer, more preferably from about 60 to about 90 mole percent cationic functionality, may be combined with the second emulsions comprising various cationic (alk)acrylamide-based polymers described above. While it is most preferred to include a quaternary Mannich (alk)acrylamide polymer in the microemulsion, the unquaternized Mannich acrylamide polymer is also contemplated within the scope of this preferred embodiment.

In yet a most preferred embodiment of the instant invention, a stabilized composition comprising a blend of two emulsions, one of which is a microemulsion containing in its discontinuous phase a quaternized Mannich PAM and the second of which is preferably a macroemulsion containing in its discontinuous phase a copolymer of acrylamide and a quaternary dialkylaminoalkyl (alk)acrylate such as a (meth)acryloyloxyethyltrimethyl ammonium salt which includes halides and methyl sulfites. The quaternized Mannich PAM has a cationic charge which differs from the cationic charge on the acrylamide/(meth) acryloyloxyethyltrimethyl ammonium salt which includes halides and sulfites. Generally, such preferred blends comprise a quaternary Mannich PAM containing from about 20 to about 100 mole percent cationic functionality, based on the monomer, more preferably from about 60 to about 90 mole percent cationic functionality blended with a second emulsion, preferably a macroemulsion, comprising acrylamide/(meth)acryloyloxyethyltrimethyl ammonium halide copolymer containing from about 1 to about 60 mole percent cationic functionality preferably from about 1 to about 20 mole percent cationic functionality, based on the monomer. For examples, combinations of a quaternary Mannich PAM microemulsion having a 75% cationic charge with an (alk)acrylamide/(meth)acryloyloxyethyltrimethyl ammonium halide copolymer macroemulsion having a 10% cationic charge may be blended at different ratios and with aldehyde scavenger to provide stable emulsion blends having a variety of intermediate charges such as polymer combinations having 55%, 35% and 20% total cationic functionality, based on the monomer. Great cost advantages are attained by preparing this bimodal emulsion in this manner, as opposed to synthesizing a single polymeric emulsion having a 55%, 35% or 20% cationic charge. And, the resulting polymeric emulsion blend may exhibit flocculation performance that is just as effective, if not more effective, than a single microemulsion, macroemulsion or a solution containing a similar polymer of identical cationic charge.

In yet another embodiment of the present invention, microemulsion Mannich PAMs or quaternized derivatives thereof are combined with an aldehyde stabilizer and a second emulsion, preferably macroemulsion, containing any anionic water-swellable, preferably water-soluble, (alk) acrylamide-based polymer, preferably an anionic (alk) acrylamide-based polymer, more preferably an anionic (alk) acrylamide-based polymer selected from acrylamido-alkyl sulfonic acid and copolymers of (alk)acrylamide with one or more anionic monomers selected from acrylic acid, methacrylic acid, and their alkali metal or ammonium salts; vinyl sulfonic acid; 2-acrylamido-2-alkylsulfonic acids such as acrylamido-2-methyl propanesulfonic acid and their salts. Preferred anionic polymers employed in the microemulsions used in the present invention contain from about 20 to about 100 mole percent anionic functionality, based on the monomer, more preferably from about 60 to about 90 mole percent anionic functionality, based on monomer. Preferred anionic polymers employed in the second emulsions used in the present invention contain from about 1 to about 60 mole percent anionic functionality based on monomer, preferably from about 1 to about 20 mole percent anionic functionality, based on the monomer.

Stabilized compositions comprising blends of functionalized polymeric microemulsions, preferably quaternary Mannich PAM microemulsions, aldehyde scavenger and second emulsions, preferably macroemulsions, containing any nonionic water-swellable or water-swellable acrylamide or (meth)acrylamide are also contemplated within the scope of this invention. It is also within the scope of this invention to combine any of the following water-swellable, preferably water-soluble, polymeric emulsions: a cationic functionalized polymeric microemulsion and non-ionic or anionic (alk)acrylamide-based second emulsions and to combine nonionic or anionic functionalized polymer microemulsions with cationic, anionic or nonionic (alk)acrylamide-based polymeric second emulsions.

The Mannich acrylamide polymer-containing microemulsion is prepared by admixing an aqueous solution comprising acrylamide monomer with a liquid hydrocarbon, such as a low odor parrafin oil, which contains a suitable surfactant such as a mixture of polyoxyethylene sorbitol fatty ester and sorbitan sesquioleate. Optionally, additional vinyl comonomers such as those described above, may be included in the above mixture. The resulting admixture forms a water-in-oil microemulsion which is subject to polymerization conditions, reacted with an effective amount of formaldehyde and a secondary amine, or a complex formed by a formaldehyde and secondary amine, to form an amino methylated polyacrylamide or Mannich PAM.

Formaldehyde compounds useful in preparing Mannich acrylamide polymers are selected from formaldehyde, paraformaldehyde, trioxane or aqueous formalin, and the like. Useful secondary amines are generally selected from those containing 2 to 8 carbon atoms which are aliphatic, cyclic, straight chained, branched or subsituted. Preferred secondary amines include dimethylamine, methylethylamine, diethylamine, amylmethylamine, dibutylamine, dibenzylamine, piperidine, morpholine, ethanolmethylamine, diethanolamine or mixtures thereof.

A preferred method of aminomethylation involves a process wherein the formaldehyde comprises formalin and the secondary amine comprises dimethylamine. It is also preferred to employ a formaldehyde-secondary amine complex such as N,N-dimethylaminomethyl alcohol. The ratio of formaldehyde to amine is not critical and can range from about 10:1 to 1:10 by mole, respectively. It is generally preferred, however, to use a molar ratio as close to 1:1 as practical. A sufficient quantity of the amine and formaldehyde, or complex thereof, is required to aminomethylate and impart tertiary amino methyl groups to the (alk)acrylamide polymer, preferably to impart at least 1 mole percent of tertiary aminomethyl groups. The Mannich PAM may be quaternized by methods known in the art, such as by reacting the Mannich polymers with quaternizing agents such as methyl chloride, dimethyl sulfate, benzyl chloride and the like under known conditions.

The amino methylation or Mannich reaction is preferably performed after microemulsion polymerization by adding formaldehyde and secondary amine to the polymer to form the tertiary aminomethyl substitutent on the polymer backbone. It is also possible, to perform the Mannich reaction at various stages in relation to inverse microemulsion polymerization. For example, one may react the (alk)acrylamide monomer with the formaldehyde and secondary amine prior to the inverse microemulsion formation and before polymerization of the monomers. Also contemplated, is adding the formaldehyde and secondary amine to the aqueous solution prior to polymerizing and then simultaneously polymerizing the (alk)acrylamide monomer and carrying out the Mannich reaction. However, these alternative procedures are less preferred than adding the formaldehyde and secondary amine after inverse microemulsion polymerization is complete. The preparation of Mannich acrylamide polymers and quaternized derivatives thereof is further described in U.S. Pat. No. 5,037,881, the disclosure of which is incorporated herein by reference.

Quaternized Mannich (alk)acrylamide polymers are preferably heat treated in their microemulsion form, before being blended with the second emulsion. Heat treatment is conducted according to the procedure in U.S. application Ser. No. 08/018,858, the disclosure of which is incorporated herein by reference. Generally, heat treatment is performed by (a) adding to the untreated quaternized Mannich PAM microemulsion, with agitation, an aqueous solution containing an acid such that the pH range of the resulting quaternized Mannich PAM microemulsion is from about 3.6 to about 4.8; preferably about 3.8 to about 4.6, and adding a formaldehyde scavenger, (b) adjusting the polymer content of the aqueous phase to about 10 to about 45 wt. percent, preferably about 20–40, wt. percent, and (c) heating the quaternized Mannich PAM polymer microemulsion obtained in step (b) to a temperature of from about 40° to about 80° C. for from about 3 to about 20 hours.

Any water-soluble acid may be used in this heat treating procedure. The acid is preferably employed as an aqueous solution and preferably comprises (i) an organic carboxylic acid, an inorganic acid or a combination thereof in an amount sufficient to provide a pH of from about 3.6 to about 4.8 in the resulting emulsion; (ii) from about 0.01 to about 30 mole percent of a formaldehyde scavenger based on the total moles of quaternized Mannich PAM microemulsion; and (iii) water, if necessary, in an amount such that when added to the microemulsion the resulting aqueous phase contains from about 10 to about 45 weight percent of quarternized amino methylated PAM microemulsion.

The acid, preferably an organic carboxylic acid, inorganic acid and/or combination thereof, is used in sufficient quantity such that the resulting pH of the microemulsion is from about 3.6 to 4.8, preferably 3.8–4.6. The quantity of each individual acid or combination of acids employed in the stabilized solution is determined by acidity (pKa) of each individual acidic component. The total amount of acid used in the practice of the present invention may vary from about 1 to about 40 mole percent based on the total number of moles of polymer present in the microemulsion. The only limitation on the acid used is that it be inert with respect to the ingredients which are present in the microemulsion system, i.e. emulsifier, polymer, oil and other generally added ingredients.

Acids which may be employed for use herein include, but are not limited to, mono and multifunctional carboxylic acids such as acetic, maleic, fumaric, formic, acrylic, succinic, lactic, citric and the like; inorganic acids such as sulfurous, phosphoric, phosphorous and sulfuric acids as well as salts of these acids such as the alkali salts of sulfurous acid, aluminum sulfate, aluminum chloride, sodium sulfate and the like. Any combination of the above-mentioned acids may be employed as long as the quaternized Mannich PAM microemulsion has, after the addition of the stabilizer solution, a pH within the range set forth above.

The formaldehyde scavengers useful for stabilizing the microemulsion are those water-soluble compounds which have the capability to react with formaldehyde. The source of formaldehyde in the quaternized Mannich (alk) acrylamide polymer microemulsion of the present invention results from unreacted formaldehyde or from labile formaldehyde components that release formaldehyde. The quantity of formaldehyde scavenger used to heat treat the microemulsions used herein ranges from about 0.01 to about 30 mole percent, preferably ranging from about 0.6 to about 15 mole percent, based on the moles of polymer in the microemulsion.

Typical formaldehyde scavengers are those known in the art, and include, but are not limited to, urea, substituted ureas such as ethylene urea, guanidine salts, dicyanamide, sulfurous acid and any of its alkali metal salts such as sodium bisulfite, sodium metabisulfite and the like, as well as phosphorous acid and mixtures of any of the foregoing.

The quantity of water preferably used in the stabilizer solutions is selected such that the resulting aqueous phase of the microemulsion contains from about 10 to about 43 weight percent polymer, based on the weight of the total aqueous phase, preferably from about 15–40 weight percent, same basis.

The formaldehyde scavenger and the acid, preferably in the form of an aqueous solution, thereof, as described hereinabove, are then added to the microemulsion with mixing. The resulting microemulsion is then heated to a temperature ranging from about 40° to about 80° C. for a time of from about 3 to about 20 hours. The heating step can be carried out immediately after addition of the acid, scavenger and/or water, however, it is also possible to delay the heating up to the desired time of use of the microemulsion as a flocculant.

The stabilized quaternized Mannich PAM microemulsion obtained after the heat treating will successfully invert when added to water independent of the temperature or pH or the water used. The aforesaid heat treating step is preferred, but not essential, for the microemulsions comprising functionalized polymers, preferably quaternary Mannich (alk) acrylamide polymers which are used for preparing emulsion blends. When heat treating the functionalized polymeric microemulsion is not performed, the inversion of the stable emulsion blends are more dependent on pH and temperature.

In another preferred embodiment of the present invention, a stabilized composition comprises a multimodal emulsion made from, an inverse microemulsion containing a functionalized water-soluble polymer, a second inverse emulsion containing an (alk)acrylamide-based polymer and a blend stabilizing amount of aldehyde scavenger. The second emulsion may be a macroemulsion or a microemulsion provided that its polymer-containing droplets have a volume average diameter which is greater than the volume average diameter of the droplets in the microemulsion with which it is combined with. Generally, the second emulsion droplets should be at least about 150 Å greater, preferably at least about 300 Å greater than and more preferably at least about 1000 Å greater than and most preferably at least about 2000 Å greater than the volume average diameter of droplets in the microemulsion. In cases where two or more microemulsions are combined with a second emulsion, the volume average diameter in the second emulsion must be greater, generaly at least about 150 Å greater than, preferably at least about 300 Å greater than and more preferably at least about 1000 Å greater than and most preferably at least about 2000 Å greater than the smallest volume average aqueous droplet diameter among the microemulsions. In cases where two or more second emulsions are combined with one microemulsion, the second emulsion having the largest volume average droplet diameter must be greater than, generaly at least about 150 Å greater than, preferably at least about 300 Å greater than and more preferably at least about 1000 Å greater than and most preferably at least about 2000 Å greater than the volume average droplet diameter of the droplets in the microemulsion.

A multimodal emulsion may be prepared using a microemulsion as the second emulsion. This microemulsion can be prepared according to the procedure disclosed above, except that the formulation should be adjusted according to knowledge in the art to obtain an emulsion comprising polymer-containing aqueous droplets having a volume average diameter that is greater than the volume average diameter of the aqueous droplets in the microemulsion with which it is combined. For example, if one desired to combine a microemulsion comprising aqueous droplets having a volume average droplet diameter of 1000 Å with a second emulsion, then the second emulsion may be a microemulsion having a volume average aqueous droplet diameter greater than 1000 Å, generally greater than at least about 1150 Å, preferably greater than about 1300 Å, more preferably greater than about 2000 Å and most preferably greater than about 3000 Å. Using common knowledge of those skilled in the art, along with simple experimentation, one can modify the microemulsion polymerization to obtain slightly larger droplets.

Another preferred embodiment is directed to a stabilized composition comprising a blend of at least two emulsions wherein at least one emulsion is a microemulsion containing a water-swellable, preferably water-soluble, glyoxalated (alk)acrylamide, as the functionalized polymer, and a second emulsion containing any water-swellable, preferably water-soluble, (alk)acrylamide-based polymer and a blend stabilizing amount of aldehyde scavenger.

Microemulsions containing glyoxalated (alk)acrylamide polymer are known in the art and disclosed, along with their methods of preparation, in U.S. Pat. No. 4,954,538 for example, the disclosure of which are incorporated herein by reference.

The (meth)acrylamide polymers which are glyoxalated in accordance with the present invention are prepared from such (meth)acrylamide monomers as acrylamide; per se, methacrylamide; N-alkylacrylamides such as N-methyl acrylamide; N-butylacrylamide etc; N-alkyl methacrylamides such as N-ethylmethacrylamide and the like. The glyoxalated (meth)acrylamide-containing polymer should have (1) sufficient glyoxal-reactive amide substituents and —CHOHCHO substituents to cross-link, said —CHOHCHO substituents being present in excess of about 0.5 weight percent and (2) droplet diameters which range from about 0.02 to about 0.3μ. Preferably, the —CHOHCHO substituents are present in excess of about 1.0 weight percent, and most preferably in excess of about 5.0 weight percent. Preferred droplet diameters range from about 0.03μ to about 0.2μ, and even more preferably range from about 0.035μ to about 0.1μ.

Optionally, it is preferred that the glyoxalated polymers also possess some degree of cationicity, sufficient to aid in rendering them self-substantive to cellulose fibers in aqueous suspensions. The proportion of cationic groups which is preferred is small, generally less than 10 mole percent of the polymer, although a larger proportion may be employed, if desired.

Suitable cationic monomers useful for preparing glyoxalated polymers comprise cationic, ethylenically unsaturated monomers of the following formula:

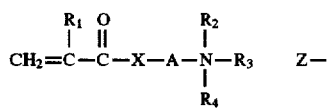

where $R_1$ is hydrogen or methyl, $R_2$ is hydrogen or lower alkyl of $C_1$ to $C_4$, $R_3$ and/or $R_4$ are hydrogen, alkyl of $C_1$ to $C_{12}$, aryl, hydroxyethyl and $R_2$ and $R_4$ or $R_2$ and $R_3$ can combine to form a cyclic ring containing one or more hetero atoms and Z is the conjugated base of acid, X is oxygen or —NR, wherein $R_1$ is as defined above, and A is an alkylene group of $C_1$ to $C_{12}$; or

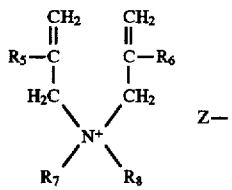

where $R_5$ and $R_6$ are hydrogen or methyl, $R_7$ is hydrogen, alkyl of $C_1$ to $C_{12}$ or benzyl and $R_8$ is hydrogen, alkyl of $C_1$ to $C_{12}$ benzyl or hydroxyethyl; and Z is as defined above.

Preferred cationic monomers include diallyl dialkylammonium chlorides, 1-methyacryloyl-4-methyl piperizine; N,N-dialkylaminoalkyl(meth)acrylates; N,N-dialkylaminoalkyl(meth)acrylamides, salts, quaternaries and mixtures thereof.

In addition, up to about 85 mole percent of the (meth)-acrylamide containing polymer may be composed of a water-soluble, non-ionic, ethylenically unsaturated comonomer copolymerizable therewith such as N-vinyl pyrrolidone; N,N-dialkyl(meth)acrylamides including N,N-dimethyl acrylamide; hydroxyalkyl(meth)acrylates; N-vinyl formamide and the like.

Furthermore, the (meth)acrylamide containing polymers useful herein may contain small amounts, i.e. up to about 10 mole percent, of other copolymerizable monomers such as methyl acrylate; methyl methacrylate; acrylonitrile; vinyl acetate; styrene and the like.

The glyoxalated (meth)acrylamide polymers can be prepared in several ways. One approach is to prepare an inverse microemulsion containing (meth)acrylamide and, optionally, a cationic and/or other monomer(s), and to subject it to cationic and/or other monomer(s), and to subject it to simultaneous polymerization conditions. After the polymerization is complete, glyoxal is added to the polymerization media and reacted with the polymer in the aqueous polymer containing droplets. The rate of the reaction of the glyoxal with the polymer can be controlled with temperature and pH. Temperatures ranging from about 10° C. to about 90° C. and a pH of about 2 to about 7, may be used. The rate of reaction increases with increasing temperate and pH.

A second approach is to prepare an inverse microemulsion containing (meth)acrylamide/glyoxal, and, optionally, a cationic or other monomer, and to subject it to simultaneous polymerization and glyoxalation conditions. The glyoxal present in the aqueous droplets reacts with the (meth) acrylamide monomer or the resultant polymer or both to produce the glyoxalated polymer, as discussed above. Both of these approaches lead to inverse microemulsions possessing aqueous droplets containing glyoxalted (meth) acrylamide polymers.

The second emulsion may be a conventional inverse macroemulsion, in which case, it is prepared by conventional macroemulsion polymerization methods known in the art such as, for example, that disclosed in U.S. Pat. No. 3,284,393 to Vanderhoff et al, the disclosure of which is incorporated herein by reference. The polymerizable water-soluble monomers, described above, which produce water-swellable or preferably water-soluble polymers may be used to prepare the inverse macroemulsions used to prepare the stabilized compositions of the present invention. The water-soluble monomers and monomer mixtures are polymerized to low or high molecular weight polymers or copolymers using a water-in-oil emulsion polymerization procedure in which the water-soluble monomers are emulsified in an oil phase by means of a water-in-oil emulsifier and subject to polymerization conditions to form the inverse macroemulsion. The monomer content in the aqueous solution can vary anywhere between about 5 and 100% by weight monomer though this may vary depending on the monomer and temperature of polymerization. Thus, the discontinuous phase or droplets are usually aqueous but may consist of 100% polymer and 0% water and are prepared using methods known in the art. The term "aqueous droplets" as used herein includes droplets containing amounts of 100% polymer.

The ratio of aqueous phase, which is defined as the monomers or polymer and water, to oil phase widely varies between about 0.01:1 to about 4:1, preferably between about 1:1 to about 4:1. The oil phase includes the hydrocarbon liquid and the surfactant dissolved or dispersed therein.

An emulsifying agent of the water-in-oil type is used in amounts ranging from about 1 to about 6% by weight of the aqueous phase in order to emulsify the monomer-containing aqueous phase into the oil phase. A wide variety of conventional water-in-oil emulsifying agents which are typically used to prepare macroemulsions may be used, such as, hexadecyl sodium phthalate, sorbitan monoleate, sorbitan monostearate, cetyl or stearyl sodium phthalate, metal soaps, and the like. Upon performing relatively simple tests, one skilled in the art would be able to determine whether a specific water-in-oil emulsifying agent or emulsion mixture would be adequate for a particular system.

The oil phase can be any inert hydrophobic liquid such as, for example, hydrocarbons, perchloroethylene, aryl hydrocarbons, such as toluene and xylene. Preferably paraffin solvents are used.

Polymerization of the macroemulsion may be carried out pursuant to those methods known in the art, including high energy irradiation such as gamma irradiation, ultraviolet irradiation or the like. Free radical initiators may also be used, such as potassium persulfate, as well as azo compounds, peroxides and redox pairs or the like. Certain polymerization methods may preferably be carried out at elevated temperatures.

Preferably, the emulsifying agent is dissolved in the oil phase and the monomer-containing aqueous phase is added to the oil phase with agitation until the aqueous phase is emulsified in the oil phase. Additional conventional additives such as chelating agents, small amounts of chain transfer agents and difunctional monomers such as methylene (bis)acrylamide, may also be dissolved in the aqueous phase or mixed into the inverse emulsion. Polymerization agents, such as free radical initiators, may be dissolved in the oil or aqueous phase or the emulsion. Polymerization is conducted preferably with agitation, until conversion is substantially complete. The resulting polymeric macroemulsion may be subsequently stabilized or treated according to any methods known in the art.

To prepare the stabilized compositions according to the present invention, at least one polymeric microemulsion, is blended with at least one second emulsion with just enough agitation to admix the emulsions in a reasonable time. Intense mechanical agitation or shear is not necessary. However, if intense mechanical agitation is used in blending the two or more emulsions, that process does not fall outside the scope of the present invention provided that at least one of the emulsions used is a microemulsion.

While the preferred embodiment of this invention contemplates blending one polymeric microemulsion with one second emulsion, which is preferably a macroemulsion, the instant claimed invention contemplates the blending of more than two emulsions, such as blending two or more microemulsions with one macroemulsion or blending one microemulsion with two or more macroemulsions or blending two or more microemulsions, with the second emulsion being a microemulsion. A variety of polymer combinations may be incorporated in the foregoing.

The stable compositions of the present invention are useful in facilitating a wide variety of solid-liquid separation operations such as flocculation for waste water treatment or for paper manufacture processes, the clarification of deinking process waters and the like. The stable polymeric emulsions may be used in the dewatering of biologically treated suspensions, such as sewage and other municipal or industrial sludges, the drainage of cellulosic suspensions such as those found in paper production, in the treatment of paper waste, and settlement of various suspensions, i.e., refinery waste, food waste, etc. The stable emulsions of the present invention may also be used as retention aids, wet strength or dry strength agents in the manufacture of paper, for protein recovery and as mining waste treating and settling aids.

With respect to flocculation applications, the stable compositions may be employed in its emulsion form or in the form of a dilute aqueous solutions prepared by inverting the emulsion into water, optionally in the presence of a breaker surfactant. When breaker surfactant is added, it should be in an amount sufficient to enable the inverted polymer or polymer combination to reach its maximum solution viscosity. Optionally, the breaker surfactant may be added to the microemulsion or the second emulsion or both before mixing the two.

In addition to inverting the stable emulsion compositions of the present invention, the polymers in the emulsion blend may be recovered from the emulsion by conventional means, such as by stripping or by adding the emulsion blend to a solvent which precipitates the polymer, e.g., isopropanol or acetone, filtering off the resultant solids, drying and redispersing in water to form a dilute aqueous solution of polymer. Dilute aqueous solutions include solutions containing water-swellable as well as water-soluble polymers. The emulsion blends of the present invention may also be stripped to increase the percentage of polymer solids.

Since the stabilized compositions produced herein can contain two different polymers, they can be used to provide both a cationic and an anionic polymer or both a high molecular weight polymer and a low molecular weight polymer substantially simultaneously for facilitating the separation of suspended solids from aqueous dispersions containing suspended solids. The advantage of this is that a single handling apparatus and single dosage point may be used to employ two different polymers.

An alternative method of practicing the present invention is to blend, substantially simultaneously into the aqueous dispersion medium to be treated, flocculating amounts of the one or more microemulsions comprising a water-soluble functionalized polymer with the second emulsion(s) and a blend stabilizing amount of aldehyde scavenger; the aldehyde scavenger may also first be added to the microemulsion; the aldehyde scavenger may also first be added to the microemulsion. Or, one may add to the dispersion medium a blend of microemulsion(s) containing a water-soluble functionalized polymer and second emulsion(s) containing a water-soluble (alk)acrylamide-based polymer and a blend stabilizing amount of aldehyde scavenger. For example, if one desired to use a stable emulsion blend according to this invention for municipal sludge, one could add substantially simultaneously flocculating amounts of the microemulsion(s) and second emulsion(s) into the sludge dispersion to be treated and mix the two or more emulsions within the dispersion. This method may be less preferred.

Flocculating amount is the amount of emulsion or dilute aqueous solution for sufficiently flocculating suspended solids in an aqueous dispersion. That amount will depend upon the particular application and the severity of the problem addressed. For the flocculation of paper sludge or municipal sludge, for example, it is preferable to use an amount of emulsion or dilute aqueous solution capable of providing anywhere from about 0.02 to about 200 pounds total polymer per ton of dry sludge, more preferably from about 1 to about 100 pounds total polymer per ton of dry sludge. The appropriate dosage for each application may be easily ascertained by simple experimentation or from knowledge in the art.

It is believed that one skilled in the art can use the preceding description to utilize the present invention to its fullest extent.

DESCRIPTION OF THE PREFERRED EMBODIMENTS

The following examples are set forth for illustration purposes only and are not to be construed as limitations on the present invention, as set forth in the appended claims.

Standard Viscosity (SV) is measured by adding 8 grams of a 0.2% aqueous polymer solution to 8.6 grams of a 2N NaCl aqueous solution, stirring the resulting mixture for 5 minutes to dissolve the salt, adjusting the pH to 5 0.5 for cationic polymers and pH 8 for anionic polymers and determining the viscosity at 25° C. with a Brookfield viscometer (LVT model) with UL adapter at 60 rpm.

Examples 1–12 illustrate the preparation of a variety of polymeric compositions in an inverse microemulsion formulation.

EXAMPLE 1

Preparation of Poly(acrylamide) Inverse Microemulsion

To 2236 g of an organic solution containing 1820 g of low odor paraffin oil, 290 g of Polyoxyethylene sorbitol fatty acid ester and 126 g of Sorbitan sesquioleate is slowly added 2208.9 g of a pH=3 aqueous solution containing 1000 g acrylamide (AMD) 60 g of acetic acid, 2 g of isopropanol, 20.1 g of ethylenediaminetetraacetic acid tetra sodium salt, 1.5 g of sodium bromate, 1.4 g of sulfuric acid and 1123.9 g of water. The resulting monomer emulsion is sparged for 60 minutes with nitrogen. $SO_2$ gas is then bubbled through the emulsion at a rate maintaining the rate of temperature increase around 2° C./min. allowing a maximum batch temperature of 65° C. Once the AMD conversion is greater than 99% the batch is cooled to 30° C. The result is a clear, stable PAM microemulsion having a SV between 3.0 and 4.0 cps.

EXAMPLE 2

Preparation of N,N-Dimethylaminomethanol (DMAM-S)

Paraformaldehyde 450 g (92%, 414 g real) is slowly added to an aqueous dimethylamine solution containing 640 g of real dimethylamine and 427 g water while maintaining the temperature below 30° C. until the solids dissolve. Dicyanamide 60 g and 70 g of sodium metabisulfite and 378 g of $H_2O$ are added maintaining the temperature below 35° C. affording DMAM-S.

EXAMPLE 3

Preparation of PAM-Mannich-75 Inverse Microemulsion 4425.4 g of PAM microemulsion of Example 1 is placed in a reaction vessel at ambient temperature. To this are slowly added 885.0 g of low odor paraffin oil followed by 2025 g of DMAM-S of Example 2, the DMAM-S being added over a 1.5 hour period maintaining the temperature between 30°–35° C. The resulting PAM-Mannich microemulsion is stirred at this temperature for an additional 16 hours. The resulting PAM-Mannich, 7335.4 g is obtained as an opaque microemulsion.

EXAMPLE 4

Quaternization of PAM-Mannich Microemulsion of Example #3

7025.4 g of PAM-Mannich of Example 3 is placed in a stirred pressure reactor and the temperature adjusted to 25° C. To this is added 839 g of methyl chloride at a rate sufficient to maintain the temperature below 32° C. and the reactor pressure below 30 psi. The resulting microemulsion is stirred at this temperature for an additional 18 hours. After this time, the pH of the emulsion is between 5 and 6 and the excess methyl chloride removed. To the resulting microemulsion is added 140 g of a 23% sodium metabisulfite solution followed by 253 g of ethoxylated nonylphenol. The resulting product is a clear, stable quaternized Mannich PAM microemulsion having an average of 75±5% cationic charge as measured by infrared spectroscopy.

EXAMPLE 5

Heat Treatment of Microemulsion of Example 4

8519.6 g of the Quaternized PAM-Mannich Microemulsion of Example 4 is placed in a reaction vessel at ambient temperature. To this is slowly added with stirring 453.4 g of low odor paraffin oil and 668.9 g of buffer solution, which consists of 66.2 g of urea, 111.6 g of 88.5% lactic acid and 491.1 g of water. The resulting mixture is heated to 67° C. and maintained for 9 hours with agitation. The resulting product is an opaque microemulsion.

EXAMPLE 6

Preparation of PAM-Mannich-55 Inverse Microemulsion 4425.4 g of PAM microemulsion of Example 1 is placed in a reaction vessel at ambient temperature. To this are slowly added 885.0 g of low odor paraffin oil followed by 1420.0 g of DMAM-S of Example 2, the DMAM-S being added over a 1.5 hour period maintaining the temperature between 30°–35° C. The resulting PAM-Mannich microemulsion is stirred at this temperature for an additional 16 hours. The resulting PAM-Mannich, 6730.4 g is an opaque microemulsion.

EXAMPLE 7

Quaternization of PAM-Mannich Microemulsion of Example 6

6700.0 g of PAM-Mannich of Example 6 is placed in a stirred pressure reactor and the temperature adjusted to 25° C. To this is added 645.9 g of methyl chloride at a rate maintaining the temperature below 32° C. and the reactor pressure below 30 psi. The resulting microemulsion is stirred at this temperature for an additional 18 hours. After this time, the pH of the emulsion is between 5 and 6 and the excess methyl chloride removed. To the resulting microemulsion is added 215.9 g of ethoxylated nonylphenol. The resulting product is a clear, stable quaternized Mannich PAM microemulsion having an average of 55±5% cationic charge as measured by infrared spectroscopy.

EXAMPLE 8

Heat Treatment of Quaternized PAM-Mannich Microemulsion of 7197.0 g of the Quaternized PAM-Mannich Microemulsion of Example 7 is placed in a reaction vessel at ambient temperature. To this is slowly added with stirring 453.4 g of low odor paraffin oil and 2032.6 g of buffer solution, which consists of 70.6 g of urea, 93.5 g of 88.5% lactic acid and 1868.5 g of water. The resulting mixture is heated to 67° C. and maintained for 9 hours with agitation. The resulting product is an opaque microemulsion.

EXAMPLE 9

Preparation of Ammonium Acrylate/Acrylamide Copolymer Microemulsion.

An organic solution is prepared by combining a low odor paraffin oil (252.0 g), sorbitan sesquioleate (8.5 g) and polyoxyethylene sorbitol fatty acid (39.5 g) in a reactor with stirring. To this solution is added an aqueous solution of pH=8.0 containing acrylamide (84.0 g), acrylic acid (36.0 g) neutralized with aqueous ammonium hydroxide (35.7 g), tert-butyl hydroperoxide (0.048 g), ethylenediaminetetraacetic acid tetra sodium salt (0.24 g), and water (144.0 g).

The reactor is sealed and sparged with nitrogen for 30 minutes. Sulfur dioxide gas is then bubbled in to the emulsion at rate so as to maintain a temperature rise of around 2.0° C./min. The sulfur dioxide flow rate is maintained until the combined acrylic acid/acrylamide conversion is greater than 99%.

EXAMPLE 10

Preparation of 2-Acrylamido-2-Methyl-1-Propanesulfonic Acid Sodium Salt/Acrylamide Copolymer Microemulsion.

An organic solution is prepared by combining a low odor paraffin oil (252.0 g), sorbitan sesquioleate (6.0 g) and polyoxyethylene sorbitol fatty acid (42.0 g) in a reactor with stirring. To this solution is added an aqueous solution containing acrylamide (50.8 g), 2-acrylamido-2-methyl-1-propanesulfonic acid sodium salt (69.2 g), tert-butyl hydroperoxide (0.048 g), ethylenediaminetetraacetic acid tetra sodium salt (0.24 g), and water (179.7 g).

The reactor is sealed and sparged with nitrogen for 30 minutes. Sulfur dioxide gas is then bubbled in to the emulsion at rate so as to maintain a temperature rise of around 2.0° C./min. The sulfur dioxide flow rate is maintained until the combined acrylamido-2-methyl-1-propanesulfonic acid sodium salt/acrylamide conversion is greater than 99%.

EXAMPLE 11

Preparation of Acryloyloxyethyltrimethylammonium Chloride/Acrylamide Copolymer Microemulsion.

An organic solution is prepared by combining a low odor paraffin oil (208.4 g), polyoxyethylene sorbitan monooleate (9.0 g) and polyoxyethylene sorbitan trioleate (32.6 g) in a reactor with stirring. To this solution is added an aqueous solution, adjusted to pH=3.5 with sulfuric acid, containing acrylamide (24.0 g), acryloxyethyltrimethyl ammonium chloride (80.2 g), sodium bromate (0.01 g), ethylenediaminetetraacetic acid tetra sodium salt (0.21 g), and water (145.58 g).

The reactor is sealed and sparged with nitrogen for 30 minutes. Sulfur dioxide gas is then bubbled into the emulsion at rate so as to maintain a temperature rise of around 2.0 C/min. The sulfur dioxide flow rate is maintained until the combined 2-acrylamido-2-methyl-1-propanesulfonic acid sodium salt/acrylamide conversion is greater than 99%.

EXAMPLE 12

Preparation of Diallyldimethylammonium Chloride/Acrylamide Copolymer Microemulsion.

An organic solution is prepared by combining a low odor paraffin oil (240.0 g), polyoxyethylene sorbitan monooleate (10.0 g) and polyoxyethylene sorbitol fatty acid (50.0 g) in a reactor with stirring. To this solution is added an aqueous solution of pH=2.9 containing acrylamide (33.8 g), diallyldimethylammonium chloride (50.7 g), N-(2-hydroxyethyl) ethylenediaminetriacetic acid (0.25 g), ammonium persulfate (0.0032 g) and water (115.9 g).

The reactor is sealed and sparged with nitrogen for 30 minutes. A solution of ferrous ammonium sulfate hexahydrate (0.45 wt % in water) is added at a rate so as to maintain a reaction temperature of 30°-35° C. The ferrous ammonium sulfate hexahydrate flow rate is maintained for 20 hours.

Examples 13-25 illustrate the preparation of a variety of polymeric compositions in an inverse macroemulsion formulation.

EXAMPLES 13-15

Preparation of Acrylamide/Acryloxyethyltrimethyl Ammonium Chloride Inverse Emulsion Polymers General polymerization procedure. AMD, acryloxyethyltrimethylammonium chloride, ammonium sulfate, glutaric acid solution, ethylenediaminetetraacetic acid tetra sodium salt solution, isopropanol, tert-butyl hydroperoxide solution, and DI water are combined and the pH adjusted to 3.5 with sulfuric acid. Sorbitan monooleate is combined with low odor paraffin oil. The aqueous solution is slowly added to the oil solution and the combined mixture homogenized until a viscosity of 1200–1500 cps is obtained. The emulsion is sparged with nitrogen. The emulsion is heated to 40° C. The metabisulfite (MBS) solution is added at a rate to keep the reaction temperature between 40°–45° C. This is maintained until the reaction conversion is at least 99%.

TABLE 1

| Components | Ex. 13<br>20% Charge | Ex. 14<br>40% Charge | Ex. 15<br>55% Charge |
|---|---|---|---|
| Oil Phase | | | |
| Oil | 176.50 g | 176.50 g | 173.40 g |
| Sorbitan monooleate | 17.90 g | 17.90 g | 21.00 g |
| Aqueous Phase | | | |
| AMD (50% soln.) | 249.82 g | 179.02 g | 138.8 g |
| Acryloxyethyltrimethyl ammonium chloride (80% soln.) | 106.20 g | 169.04 g | 289.50 g |
| Ammonium sulfate | 4.10 g | 4.10 g | 4.10 g |
| Glutaric acid (50% soln.) | 29.40 g | 29.40 g | 36.12 g |
| ethylenediaminetetra acetic acid tetra sodium salt (5% soln.) | 3.92 g | 4.90 g | 6.00 g |
| Isopropanol | 4.20 g | 3.15 g | 0.75 g |
| tert-butyl hydroperoxide | 0.50 g | 0.50 g | 3.20 g |
| De-ionized water | 92.46 g | 100.49 g | 12.11 g |

EXAMPLES 16-18

Preparation of Acrylamide/Acryloxyethyltrimethyl Ammonium Chloride Inverse Emulsion Polymers General polymerization procedure. The aqueous phase components listed below are combined and the pH adjusted to 3.5 with sulfuric acid. The sorbitan monooleate is combined with low odor paraffin oil. The aqueous phase is slowly added to the oil phase and the combined mixture homogenized until a viscosity of 1200–1500 cps is obtained. The emulsion is sparged with nitrogen and heated to 40° C. 15 mL of a 0.8 wt % sodium metabisulfite solution in deionized (DI) $H_2O$ is prepared and sparged with nitrogen. The sodium metabisulfite is added to the polymerization mixture at a rate sufficient to maintain the temperature of the mixture between 40°–45° C. This is maintained until the reaction conversion is at least 99%. At the completion of the polymerization 10.0 g of a 30% wt. % solution of sodium metabisulfite in DI $H_2O$ is added to the emulsions containing polymer having 1 and 5% charge over 15 minutes.

TABLE 2

| Components | Ex. 16<br>1% Charge | Ex. 17<br>5% Charge | Ex. 18<br>10% Charge |
|---|---|---|---|
| Oil Phase | | | |
| Oil | 176.50 g | 176.50 g | 176.50 g |
| Sorbitan monooleate | 17.90 g | 17.90 g | 17.90 g |
| Aqueous Phase | | | |
| AMD (50% soln.) | 354.25 g | 371.28 g | 354.00 g |
| Acryloxyethyltrimethyl ammonium chloride (80% soln.) | 6.10 g | 33.33 g | 67.13 g |

TABLE 2-continued

| Components | Ex. 16 1% Charge | Ex. 17 5% Charge | Ex. 18 10% Charge |
|---|---|---|---|
| Ammonium sulfate | 0.00 g | 0.00 g | 4.10 g |
| Glutaric acid (50% soln.) | 25.47 g | 25.47 g | 27.70 g |
| ethylenediaminetetra acetic acid tetra sodium salt (5% soln.) | 4.25 g | 4.25 g | 0.00 g |
| Pentasodium diethylenetri- amine pentaacetic acid (40% soln.) | 0.00 g | 0.00 g | 0.58 g |
| Isopropanol | 1.83 g | 2.12 g | 2.31 g |
| NaBrO$_3$ (2% soln.) | 0.00 g | 1.00 g | 2.10 g |
| tert-butyl hydroperoxide (2% soln.) | 1.00 g | 0.00 g | 0.00 g |
| De-ionized water | 86.78 g | 43.46 g | 32.68 g |

EXAMPLE 19

Preparation of 2-Acryloyloxyethyltrimethylammonium Chloride/Acrylamide Copolymer (45/55 mole %) Inverse Emulsion Polymerization Procedure The oil phase and aqueous phase enumerated below are prepared separately. Thereafter they are combined and homogenized to yield a monomer emulsion. The monomer emulsion is purged with nitrogen and SO$_2$ is bubbled through the emulsion at a rate sufficient to bring the emulsion temperature up to and maintained at 40° C. This is continued until the polymerization is complete. The emulsion is cooled to room temperature and Ethoxylated alcohol-60% EO is added with stirring.

| Oil Phase: | |
|---|---|
| Low odor paraffin oil | 177.20 g |
| Sorbitain monooleate | 8.10 g |
| Ethoxylated alcohol - 60% EO | 12.69 g |
| Total Oil Phase: | 197.99 g |
| Aqueous Phase: | |
| Acrylamide (52.77%) | 144.07 g |
| Acryloyloxyethyltrimethyl ammonium Chloride (80%) | 315.41 g |
| Pentasodium diethylenetriamine pentaacetic acid (40%) | 0.82 g |
| 2-Propanol | 1.12 g |
| Citric acid | 19.68 g |
| DI Water | 110.09 g |
| Sodium bromate (2.51%) | 0.65 g |
| Aqueous Ammonia (29%) | 2.16 g |
| Total Aqueous Phase (at pH 3.5): | 594.00 g |
| Total Monomer Emulsion: | 792.00 g |
| Ethoxylated alcohol - 60% EO | 8.00 g |
| Total Product Emulsion: | 800.00 g |

EXAMPLE 20

Preparation of Structured 2-Acryloxyethyltrimethylammonium Chloride/ Acrylamide Copolymer (45/55 mole %) Inverse Emulsion Polymerization Procedure The oil phase and aqueous phase enumerated below are prepared separately. Thereafter they are combined and homogenized to yield a monomer emulsion. The monomer emulsion is purged with nitrogen and SO$_2$ is bubbled through the emulsion at a rate sufficient to bring the emulsion temperature up to and maintained at 40° C. This is continued until the polymerization is complete. The emulsion is cooled to room temperature and Malic acid and Ethoxylated alcohol-60% EO are then added with stirring.

| Oil Phase: | |
|---|---|
| Low odor paraffin oil | 11939 g |
| N,N-bis-(2-hydroxyethyl)oleamide | 524 g |
| Ethoxylated alcohol - 60% EO | 402 g |
| Total Oil Phase: | 12865 g |
| Aqueous Phase: | |
| Acrylamide (50%) | 8844 g |
| Acryloxyethyltrimethyl ammonium Chloride (80%) | 18430 g |
| Ammonium sulfate | 250 g |
| Sulfuric acid (10%) | 230 g |
| Disodium EDTA dihydrate | 19 g |
| 2-Propanol | 245 g |
| Methylene bis(acrylamide) | 0.406 g |
| DI Water | 4021 g |
| t-butyl hydroperoxide (70%) | 0.478 g |
| Total Aqueous Phase (at pH 3.5): | 32039 g |
| Total Monomer Emulsion: | 44904 g |
| Malic acid (50%) | 2300 g |
| Ethoxylated alcohol - 60% EO | 209 g |
| Total Product Emulsion: | 47413 g |

EXAMPLE 21

Preparation of Acryloxyethyltrimethylammonium Chloride/ Acrylamide Copolymer (10/90 mole %) Inverse Emulsion Containing Urea Polymerization Procedure The oil phase and aqueous phase enumerated below are prepared separately. Thereafter they are combined and homogenized to yield a monomer emulsion. The monomer emulsion is purged with nitrogen and SO$_2$ is bubbled through the emulsion at a rate sufficient to bring the emulsion temperature up to and maintained at 40° C. This is continued until the polymerization is complete. The emulsion is cooled to room temperature and Malic acid and Ethoxylated alcohol-60% EO are then added with stirring.

| Oil Phase: | |
|---|---|
| Low odor paraffin oil | 175.06 g |
| Sorbitain monooleate | 16.54 g |
| Ethoxylated alcohol - 60% EO | 4.00 g |
| Total Oil Phase: | 195.60 g |
| Aqueous Phase: | |
| Acrylamide (52.33%) | 387.14 g |
| Acryloyloxyethyltrimethyl ammonium Chloride (80%) | 76.76 g |
| Pentasodium diethylenetriamine pentaacetic acid (40%) | 1.32 g |
| 2-Propanol | 3.43 g |
| DI Water | 13.38 g |
| Urea | 65.20 g |
| Sodium bromate (2.51%) | 1.05 g |
| Sulfuric acid (conc.) | 0.52 g |
| Total Aqueous Phase (at pH 3.5): | 518.00 g |
| Total Monomer Emulsion: | 713.60 g |
| Malic acid (50%) | 68.80 g |
| Ethoxylated alcohol - 60% EO | 17.60 g |
| Total Product Emulsion: | 832.80 g |

EXAMPLE 22

Preparation of Diallyldimethylammonium Chloride Inverse Emulsion

Polymerization Procedure

The oil phase and aqueous phase are prepared separately. Thereafter they are combined and homogenized to yield a monomer emulsion. 1.28 g of 2,2'-azobis (2,4-dimethylvaleronitrile) (Vazo-52) in 10 mL of toluene are added and the monomer emulsion is purged with nitrogen. The emulsion is heated and maintained at 60° C. for 7 hours after which time the resulting emulsion is cooled to room temperature.

| Oil Phase: | |
|---|---|
| Low odor paraffin oil | 177.21 g |
| Sorbitain monooleate | 8.10 g |
| Ethoxylated alcohol - 60% EO | 12.69 g |
| Total Oil Phase: | 198.00 g |
| Aqueous Phase: | |
| Diallyldimethylammonium chloride (60%) | 533.33 g |
| Pentasodium diethylenetriamine pentaacetic acid (40%) | 1.60 g |
| DI Water | 59.07 g |
| Total Aqueous Phase: | 594.00 g |
| Total Monomer Emulsion: | 792.00 g |

EXAMPLE 23

Preparation of Ammonium Acrylate/Acrylamide Copolymer (30/70 mole %) Inverse Emulsion Polymerization Procedure The oil phase and aqueous phase enumerated below are prepared separately. Thereafter they are combined and homogenized to yield a monomer emulsion. The monomer emulsion is purged with nitrogen and $SO_2$ is bubbled through the emulsion at a rate sufficient to bring the emulsion temperature up to and maintained at 40° C. This is continued until the polymerization is complete. The emulsion is cooled to room temperature and the sodium metabisulfite solution and Ethoxylated alcohol-60% EO are added with stirring.

| Oil Phase: | |
|---|---|
| Low odor paraffin oil | 162.57 g |
| Sorbitain monooleate | 14.64 g |
| Ethoxylated alcohol - 60% EO | 5.68 g |
| Total Oil Phase: | 182.89 g |
| Aqueous Phase: | |
| Acrylamide (52.77%) | 348.72 g |
| Acrylic acid (glacial) | 79.98 g |
| Lactic acid (85%) | 0.62 g |
| Pentasodium diethylenetriamine pentaacetic acid (40%) | 0.53 g |
| t-butyl hydroperoxide (3.01%) | 0.54 g |
| Aqueous Ammonia (29%) | 66.30 g |
| DI Water | 89.12 g |
| Total Aqueous Phase (at pH 7.5): | 585.81 g |
| Total Monomer Emulsion: | 768.70 g |
| Sodium metabisulfite (30%) | 17.12 g |
| Ethoxylated alcohol - 60% EO | 14.00 g |
| Total Product Emulsion: | 799.82 g |

EXAMPLE 24

Preparation of Ammonium Acrylate/Acrylamide Copolymer (30/10 mole %) Inverse Emulsion Polymerization Procedure The oil and surfactants are combined. In a separate vessel the acrylamide and glacial acrylic acid are combined and cooled with an ice bath to approximately 10° C. The aqueous ammonia is added slowly to pH 7.0, while maintaining the monomer solution temperature below 35° C. with the use of the ice bath. The lactic acid, ethylenediaminetetraacetic acid disodium salt solution and deionized water are added to the monomer solution. The aqueous phase is slowly added to the oil phase and homogenized until a viscosity of 1200–2000 cps is achieved. The emulsion is placed in a water bath at 40° C. and the t-butyl hydroperoxide solution is added. The emulsion is purged with nitrogen for 15 minutes. 20 mL of a solution of sodium metabisulfite (MBS), 0.2% in deionized water is prepared and purged with nitrogen. The MBS solution is added at a rate sufficient to increase the reaction temperature to 50° C. within 30–50 minutes. The remainder of the MBS solution is added at a rate to maintain 50° C. until the polymerization is complete. The reaction is allowed to cool to room temperature and the aqueous ammonia, sodium metabisulfite and Ethoxylated alcohol-60% EO are added sequentially, each over a 30 minute period with stirring.

| Oil Phase: | |
|---|---|
| Low odor paraffin oil | 145.09 g |
| N,N-bis-(2-hydroxyethyl)oleamide | 12.60 g |
| Ethoxylated alcohol - 60% EO | 1.40 g |
| Total Oil Phase: | 159.09 g |
| Aqueous Phase: | |
| Acrylamide (50.0%) | 334.18 g |
| Acrylic acid (glacial) | 72.62 g |
| Lactic acid (85%) | 0.56 g |
| ethylenediamine tetraacetic acid disodium salt (10% soln.) | 7.42 g |
| Aqueous Ammonia (29% soln.) | 67.20 g |
| t-butyl hydroperoxide (1.48%) | 1.00 g |
| DI Water | 57.93 g |
| Total Aqueous Phase (at pH 7.5): | 540.91 g |
| Total Monomer Emulsion: | 700.00 g |
| Aqueous Ammonia (30%) | 5.60 g |
| Sodium metabisulfite (30%) | 17.12 g |
| Ethoxylated alcohol - 60% EO | 14.00 g |
| Total Product Emulsion: | 736.72 g |

EXAMPLE 25

Preparation of 2-Acrylamido-2-Methyl-1-Propanesulfonic Acid Sodium Salt/Acrylamide Copolymer Inverse Emulsion Polymerization Procedure The oil phase and aqueous phase enumerated below are prepared separately. Thereafter they are combined and homogenized to yield a monomer emulsion. The monomer emulsion is purged with nitrogen and $SO_2$ is bubbled through the emulsion at a rate sufficient to bring the emulsion temperature up to and maintained at 40° C. This is continued until the polymerization is complete. The emulsion is cooled to room temperature and Ethoxylated alcohol-60% EO is added with stirring.

| Oil Phase: | |
|---|---|
| Low odor paraffin oil | 175.87 g |
| Sorbitain monooleate | 14.74 g |
| Ethoxylated alcohol - 60% EO | 5.89 g |
| Total Oil Phase: | 196.50 g |
| Aqueous Phase: | |
| Acrylamide (52.89%) | 249.57 g |
| 2-Acrylamido-2-Methyl-1-Propanesulfonic Acid Sodium Salt (50%) | 264.00 g |
| 2-Propanol | 0.26 g |
| Pentasodium diethylenetriamine pentaacetic acid (40%) | 1.32 g |
| t-butyl hydroperoxide (3.01%) | 1.32 g |
| Sulfuric acid (conc.) | 0.13 g |
| DI Water | 72.90 g |
| Total Aqueous Phase (at pH 7.0–7.2): | 589.50 g |
| Total Monomer Emulsion: | 786.00 g |
| Ethoxylated alcohol - 60% EO | 14.00 g |
| Total Product Emulsion: | 800.00 g |

Examples 26–52 and 53–72 illustrate the preparation of a variety of multimodal emulsion blends arrived at by mixing a microemulsion and a macroemulsion. The data in Table 3 shows various emulsion blends made from a macroemulsion having a cationic functionality of 10 mole percent, based on monomer, and a polymeric microemulsion having a cationic functionality of 75 mole percent, based on monomer. The data for Examples 53–72 in Table 4 shows that a desired overall charge may be obtained by blending polymeric microemulsions and macroemulsions having a variety of different charges. The data in Tables 3 and 4 shows that one can, by using the process of the instant invention and varying the proportions of microemulsion and macroemulsion having certain percentage cationic functionality, easily obtain a stable emulsion blend having a desired charge. Moreover, by varying the standard viscosity of the microemulsions and macroemulsions that are blended, one can easily obtain a multimodal blend having a desired standard viscosity. A flexible process for obtaining polymeric emulsions having a desired overall charge and standard viscosity is valuable because polymer flocculation performance is known to be affected by polymer charge and standard viscosity.

emulsion polymerization. The SV of the blend is as expected from a weighed average of the component polymers.

Blend Preparation

The appropriate amount of the inverse macro-emulsion is weighed into a beaker. The appropriate amount of a 50 wt. % aqueous solution of stabilizer is added to the emulsion over a period of 5 minutes with stirring. The inverse micro-emulsion is then added over 5 minutes and the resulting blend is stirred for 30 minutes.

TABLE 3

| Blend Example | Blend Charge | Urea[1] Content (wt. %) | Blend SV[2] (cps) | Macro emulsion Charge[3] | Macro emulsion SV (cps) | Macro emulsion wt. (g) | Urea 50% soln. (g) | Micro emulsion Charge | Micro emulsion SV (cps) | Micro emulsion wt. (g) |
|---|---|---|---|---|---|---|---|---|---|---|
| 26 | 55 | 1.5 | 2.9 | 10 | 4.0 | 18.2 | 3.1 | 75 | 2.9 | 81.8 |
| 27 | 55 | 1.5 | 2.8 | 10 | 4.0 | 18.2 | 3.1 | 75 | 2.5 | 81.8 |
| 28 | 55 | 1.5 | 2.6 | 10 | 4.0 | 18.2 | 3.1 | 75 | 2.3 | 81.8 |
| 29 | 55 | 1.5 | 2.7 | 10 | 2.8 | 18.2 | 3.1 | 75 | 2.9 | 81.8 |
| 30 | 55 | 1.5 | 2.6 | 10 | 2.8 | 18.2 | 3.1 | 75 | 2.5 | 81.8 |
| 31 | 55 | 1.5 | 2.5 | 10 | 2.8 | 18.2 | 3.1 | 75 | 2.3 | 81.8 |
| 32 | 55 | 1.5 | 2.6 | 10 | 2.2 | 18.2 | 3.1 | 75 | 2.9 | 81.8 |
| 33 | 55 | 1.5 | 2.4 | 10 | 2.2 | 18.2 | 3.1 | 75 | 2.5 | 81.8 |
| 34 | 55 | 1.5 | 2.3 | 10 | 2.2 | 18.2 | 3.1 | 75 | 2.3 | 81.8 |
| 35 | 35 | 2.0 | 3.1 | 10 | 4.0 | 14.0 | 1.43 | 75 | 2.9 | 20.3 |
| 36 | 35 | 2.0 | 3.1 | 10 | 4.0 | 14.0 | 1.43 | 75 | 2.5 | 20.3 |
| 37 | 35 | 2.0 | 3.0 | 10 | 4.0 | 14.0 | 1.43 | 75 | 2.3 | 20.3 |
| 38 | 35 | 2.0 | 2.8 | 10 | 2.8 | 14.0 | 1.43 | 75 | 2.9 | 20.3 |
| 39 | 35 | 2.0 | 2.7 | 10 | 2.8 | 14.0 | 1.43 | 75 | 2.5 | 20.3 |
| 40 | 35 | 2.0 | 2.7 | 10 | 2.8 | 14.0 | 1.43 | 75 | 2.3 | 20.3 |
| 41 | 35 | 2.0 | 2.4 | 10 | 2.2 | 14.0 | 1.43 | 75 | 2.9 | 20.3 |
| 42 | 35 | 2.0 | 2.3 | 10 | 2.2 | 14.0 | 1.43 | 75 | 2.5 | 20.3 |
| 43 | 35 | 2.0 | 2.3 | 10 | 2.2 | 14.0 | 1.43 | 75 | 2.3 | 20.3 |
| 44 | 20 | 1.5 | 3.0 | 10 | 4.0 | 26.6 | 3.1 | 75 | 2.9 | 73.4 |
| 45 | 20 | 1.5 | 2.8 | 10 | 4.0 | 26.6 | 3.1 | 75 | 2.5 | 73.4 |
| 46 | 20 | 1.5 | 2.6 | 10 | 4.0 | 26.6 | 3.1 | 75 | 2.3 | 73.4 |
| 47 | 20 | 1.5 | 2.8 | 10 | 2.8 | 26.6 | 3.1 | 75 | 2.9 | 73.4 |
| 48 | 20 | 1.5 | 2.7 | 10 | 2.8 | 26.6 | 3.1 | 75 | 2.5 | 73.4 |
| 49 | 20 | 1.5 | 2.5 | 10 | 2.8 | 26.6 | 3.1 | 75 | 2.3 | 73.4 |
| 50 | 20 | 1.5 | 2.7 | 10 | 2.2 | 26.6 | 3.1 | 75 | 2.9 | 73.4 |
| 51 | 20 | 1.5 | 2.4 | 10 | 2.2 | 26.6 | 3.1 | 75 | 2.5 | 73.4 |
| 52 | 20 | 1.5 | 2.3 | 10 | 2.2 | 26.6 | 3.1 | 75 | 2.3 | 73.4 |

[1]Urea added to macroemulsion (wt. % based on emulsion blend)
[2]Standard Viscosity is measured centipoise (cps)
[3]Cationic functionality (mole % based on monomer)

EXAMPLE 26–52

Preparation of Blends
General procedure:
Polymers

The microemulsions are prepared according to Examples 1–5. The different polymer SVs are achieved by varying the amount of isopropanol used to prepare the PAM microemulsion of Example 1. The macroemulsions are prepared according to Example 18. The different polymer SVs are prepared by varying the amount of isopropanol added to the

EXAMPLE 53–72

Preparation of Blends at 55% Charge

These examples demonstrate the versatility of the process of the instant invention for blending a variety of two differently charged emulsions. It is possible to prepare blends having a desired charge from a variety of component polymers. To compensate for the charge on the component polymers, one simply varies the relative amounts of macroemulsion and microemulsion. For the blends below the appropriate amounts of a 50% aqueous urea solution was added dropwise to the macroemulsion with stirring. The microemulsion was then added to the mixture with stirring. The different polymer SVs are achieved by varying the amount of isopropanol use to prepare the microemulsions and macroemulsions. The SV of the blend is as expected from a weighted average of the component polymers.

TABLE 4

| Blend Example | Blend Charge[1] | Urea[2] Content (wt. %) | Blend SV[3] (cps) | Macro Emulsion of Example | Macro emulsion SV (cps) | Macro emulsion weight (g) | Urea 50% soln. (g) | Micro emulsion of Example | Micro emulsion SV (cps) | Micro emulsion weight (g) |
|---|---|---|---|---|---|---|---|---|---|---|
| 53 | 55 | 2.5 | 2.7 | 17 | 3.8 | 2.9 | 1.0 | 5 | 2.5 | 15.9 |
| 54 | 55 | 2.5 | 2.2 | 13 | 2.2 | 4.5 | 1.0 | 5 | 2.9 | 13.9 |
| 55 | 55 | 2.5 | 2.5 | 18 | 2.9 | 3.1 | 1.0 | 5 | 2.9 | 15.3 |
| 56 | 55 | 2.5 | 2.1 | 13 | 2.2 | 4.5 | 1.0 | 5 | 2.0 | 13.9 |
| 57 | 55 | 2.5 | 2.4 | 13 | 2.2 | 4.5 | 1.0 | 5 | 2.5 | 13.9 |
| 58 | 55 | 2.5 | 2.3 | 13 | 2.4 | 4.5 | 1.0 | 5 | 2.0 | 13.9 |
| 59 | 55 | 2.5 | 2.1 | 17 | 2.1 | 2.9 | 1.0 | 5 | 2.0 | 15.8 |
| 60 | 55 | 2.5 | 2.1 | 13 | 2.2 | 4.5 | 1.0 | 5 | 2.0 | 13.9 |
| 61 | 55 | 2.5 | 2.8 | 13 | 3.4 | 4.5 | 1.0 | 5 | 2.9 | 13.9 |
| 62 | 55 | 2.5 | 2.2 | 18 | 3.4 | 3.1 | 1.0 | 5 | 2.0 | 15.3 |
| 63 | 55 | 2.5 | 2.5 | 18 | 2.9 | 3.1 | 1.0 | 5 | 2.5 | 15.3 |
| 64 | 55 | 2.5 | 2.4 | 18 | 2.2 | 3.1 | 1.0 | 5 | 2.9 | 15.3 |
| 65 | 55 | 2.5 | 2.8 | 13 | 3.4 | 4.5 | 1.0 | 5 | 2.9 | 13.9 |
| 66 | 55 | 2.5 | 2.1 | 18 | 2.1 | 3.1 | 1.0 | 5 | 2.0 | 15.3 |
| 67 | 55 | 2.5 | 2.6 | 17 | 2.9 | 2.9 | 1.0 | 5 | 2.9 | 15.8 |
| 68 | 55 | 2.5 | 2.4 | 18 | 3.4 | 3.1 | 1.0 | 5 | 2.0 | 15.3 |
| 69 | 55 | 2.5 | 2.5 | 17 | 2.1 | 2.9 | 1.0 | 5 | 2.9 | 15.8 |
| 70 | 55 | 2.5 | 2.7 | 18 | 3.3 | 3.1 | 1.0 | 5 | 2.9 | 15.3 |
| 71 | 55 | 2.5 | 2.2 | 17 | 3.8 | 2.9 | 1.0 | 5 | 2.0 | 15.8 |
| 72 | 55 | 2.5 | 2.9 | 17 | 3.8 | 2.9 | 1.0 | 5 | 2.9 | 15.8 |

[1] Cationic functionality (mole % based on monomer)
[2] Urea added to macroemulsion (wt. % based on emulsion blend)
[3] Standard Viscosity is measured in centipoise (cps)

Examples 73–93 demonstrate the utility of adding a stabilizer to blends of the current invention.

EXAMPLES 73–79

Stabilization of 40% Charge blends by addition of urea

Blends having an overall charge of 40% are prepared from 66.58 g of the microemulsion of Example 5 and 35.64 g of the macroemulsion of Example 18. For the samples containing urea, the appropriate amount of a 50% aqueous urea solution is added to the macroemulsion with stirring. The microemulsion was then added to this mixture with stirring to yield a stabilized blend. The resulting blends are stored at room temperature for the time periods indicated. Samples of the blends are withdrawn and the SV of the blend was measured.

TABLE 5

| Example | Urea[1] Content (wt. %) | Days @ 25° C. | Standard Viscosity (SV) (cps) |
|---|---|---|---|
| 73* | 0 | 0 | 2.8 |
|  |  | 7 | 1.9 |
|  |  | 65 | 1.9 |
| 74 | 1.25 | 0 | 2.6 |
|  |  | 65 | 2.8 |
| 75 | 2.50 | 0 | 2.4 |
|  |  | 65 | 2.4 |
| 76 | 3.75 | 0 | 2.6 |
|  |  | 65 | 2.6 |
| 77 | 5.0 | 0 | 3.0 |
|  |  | 65 | 3.4 |
| 78 | 10.0 | 0 | 2.9 |
|  |  | 42 | 3.1 |

[1] Urea Added to Macroemulsion (wt. % based on emulsion blend)
*Not representative of the invention for stable emulsion blends The data in Table 5 demonstrates that when a microemulsion containing quaternized Mannich PAM, which has been heat treated with acid and a formaldehyde scavenger, is blended with a macroemulsion comprising acrylamide/acryloxyethyltrimethyl ammonium halide copolymer (Example 18), the polymer in the resulting blend does not remain stable or loses it's ability to achieve the original standard viscosity of the fresh blend. But when an aldehyde scavenger (urea) is added to the macroemulsion prior to blending, the polymer in the blend remains stable. It is known that the standard viscosity of a polymer affects flocculation performance, as shown in Table 6, which provides sludge dewatering data for some of the emulsion blends tested in Table 5. The data in Table 6 demonstrates that the addition of a stabilizer to the blend allows the stabilized blend to maintain its performance efficacy while the unstabilized blend performance deteriorates substantially with time.

The efficiency of dewatering a typical municipal sludge is determined for Examples 73, 77 and 78 in Table 6 as follows: 200 gms of sludge are carefully weighed into a beaker. Aqueous solutions of the polymers and blends are prepared by adding the polymer emulsion sample to water so that the polymer concentration is 0.2 weight percent. Various doses of the polymer solution are added to the sludge samples, water is added to bring the total weight to 250 gms, the mixture is agitated at 1000 rpm for 5 seconds and the resulting flocculated sludge is poured through a Buchner funnel containing a 60 mesh screen. The free drainage is measured by recording the volume of filtrate collected in 10 seconds. The resulting flocculated sludge is further dewatered by pressing the sample under identical conditions. The pressed sludge is then dried to constant weight to determine the final sludge solids content, i.e. the cake solids.

TABLE 6

| Example | Urea Content (wt. %) | Age (stored at room temp.) | Dose (lb/ton) | Filtrate (mL) | Cake Solids (%) |
|---|---|---|---|---|---|
| 73* | 0 | fresh | 10.4 | 55 | — |
|  |  |  | 12.2 | 71 | 20.5 |
|  |  |  | 13.2 | 85 | 20.6 |
|  |  |  | 14.1 | 87 | 17.6 |
| 73* | 0 | 6 weeks | 14.1 | 45 | — |
|  |  |  | 18.8 | 93 | 19.6 |
|  |  |  | 19.8 | 65 | 19.5 |
|  |  |  | 20.7 | 74 | — |

TABLE 6-continued

| Example | Urea Content (wt. %) | Age (stored at room temp.) | Dose (lb/ton) | Filtrate (mL) | Cake Solids (%) |
|---------|---------------------|---------------------------|---------------|---------------|-----------------|
|         |                     |                           | 23.5          | 75            | —               |
| 77      | 5                   | 6 weeks                   | 9.4           | 53            | —               |
|         |                     |                           | 10.4          | 68            | 17.6            |
|         |                     |                           | 11.3          | 48            | 12.9            |
|         |                     |                           | 12.2          | 40            | —               |
| 78      | 10                  | 6 weeks                   | 10.35         | 66            | 18.3            |
|         |                     |                           | 10.82         | 74            | 18.7            |
|         |                     |                           | 11.29         | 62            | 18.0            |
|         |                     |                           | 12.24         | 40            | —               |

[1]Urea added to macroemulsion (wt % based on blend)
*Not representative of the invention for stable emulsion blends Table 7 shows data obtained from an accelerated aging study carried out at 50° C. This data correlates with the data of Table 5 and is therefore representative of room temperature aging studies.

TABLE 7

| Example | Urea added to[1] macroemulsion (wt. %) | Days @ 50° C. | SV |
|---------|----------------------------------------|---------------|-----|
| 73*     | 0                                      | 0             | 2.8 |
|         |                                        | 1             | 1.9 |
|         |                                        | 4             | 2.1 |
| 79      | 0.84                                   | 0             | 2.6 |
|         |                                        | 1             | 2.4 |
|         |                                        | 4             | 2.3 |
|         |                                        | 8             | 2.3 |
| 74      | 1.25                                   | 0             | 2.6 |
|         |                                        | 1             | 2.6 |
|         |                                        | 4             | 3.0 |
|         |                                        | 6             | 2.5 |
|         |                                        | 8             | 2.4 |
| 75      | 2.50                                   | 0             | 2.4 |
|         |                                        | 1             | 2.4 |
|         |                                        | 4             | 2.6 |
|         |                                        | 6             | 2.5 |
|         |                                        | 8             | 2.5 |
|         |                                        | 10            | 2.4 |
|         |                                        | 12            | 2.4 |
| 76      | 3.75                                   | 0             | 2.6 |
|         |                                        | 1             | 2.6 |
|         |                                        | 4             | 2.7 |
|         |                                        | 6             | 2.7 |
|         |                                        | 8             | 2.7 |
| 77      | 5.0                                    | 0             | 3.0 |
|         |                                        | 1             | 3.1 |
|         |                                        | 4             | 3.0 |
|         |                                        | 6             | 3.1 |

*Not representative of the invention for stable emulsion blends
[1](wt % based on emulsion blend)

EXAMPLES 80–82

Method Of Stabilizing Blends By Adding Urea To The Monomer Aqueous Phase Of The Macroemulsion

Blends are prepared by adding the indicated amounts of the macroemulsion of Example 21 and the microemulsion of Example 5 to a beaker. The blend is mixed for a few minutes with the aid of a magnetic stirring bar. The blends are then aged at 50° C. for the indicated time periods. As indicated by the SV measurements, the urea in the macroemulsion is sufficient to stabilize the blends, as evidenced by no loss in SV over at least one week at 50° C. In contrast, the SV of a control blend (Example 82A), prepared identically except that no urea was added to the macroemulsion, dropped to 2.0 after aging for 1 day at 50° C.

TABLE 8

| Example | Macroemulsion of Example 21 (grams) | Microemulsion of Example 5 (grams) | Blend Charge | Urea[1] Content (wt. %) | Days at 50° | SV (cps) |
|---------|-------------------------------------|------------------------------------|--------------|------------------------|-------------|----------|
| 80      | 108.35                              | 41.35                              | 20%          | 5.6                    | 0           | 2.87     |
|         |                                     |                                    |              |                        | 1           | 2.87     |
|         |                                     |                                    |              |                        | 4           | 2.79     |
|         |                                     |                                    |              |                        | 8           | 2.99     |
|         |                                     |                                    |              |                        | 11          | 3.21     |
| 81      | 54.95                               | 95.05                              | 40%          | 2.9                    | 0           | 2.82     |
|         |                                     |                                    |              |                        | 1           | 2.82     |
|         |                                     |                                    |              |                        | 4           | 2.77     |
|         |                                     |                                    |              |                        | 8           | 2.81     |
|         |                                     |                                    |              |                        | 11          | 2.84     |
| 82      | 19.42                               | 80.58                              | 55%          | 1.5                    | 0           | 2.49     |
|         |                                     |                                    |              |                        | 1           | 2.45     |
|         |                                     |                                    |              |                        | 4           | 2.52     |
|         |                                     |                                    |              |                        | 8           | 2.35     |
|         |                                     |                                    |              |                        | 11          | 1.82     |
| 82A*    | 19.42 (macroemulsion of Example 18) | 80.58                              | 55%          | 0                      | 0           | 2.5      |
|         |                                     |                                    |              |                        | 1           | 2.0      |

[1]Urea added to macroemulsion (wt. % based on emulsion blend)
*Not representative of the invention for stable emulsion blend

EXAMPLES 82A–C

Effect of Order of Addition of Blend Components on Blend Stability

Stable emulsion blends were prepared at 55% overall charge by combining the microemulsion of Example 5 (80.6 g), the macroemulsion of Example 18 (19.4 g) and optionally a 50% aqueous urea solution (4.2 g). As shown in the Table 8A, the blends were prepared by adding either a microemulsion or macroemulsion to a vessel. To this was optionally added the aqueous urea solution over a period of 5 minutes with stirring. To this mixture the other emulsion was added and the resulting blend was stirred for 5 minutes. The control blend was unstable as evidenced by the loss in SV. Both of the stabilized blends maintained their SV after accelerated ageing. The data in Table A shows that the aldehyde scavenger may be added to either the microemulsion or the second emulsion (here macroemulsion) prior to blending the emulsions.

TABLE 8A

| Example Number | Urea Added (wt. % based on blend) | Order of Addition of Components | Original SV (cps) | SV after ageing 1 day at 50* |
|----------------|-----------------------------------|----------------------------------|-------------------|-----------------------------|
| Control Example 82* | none | 1) Macroemulsion<br>2) Microemulsion | 2.6 | 2.1 |
| Example 82B | 2.0 | 1) Macroemulsion<br>2) Urea solution<br>3) Microemulsion | 2.6 | 2.7 |
| Example 82C | 2.0 | 1) Microemulsion<br>2) Urea solution<br>3) Macroemulsion | 2.7 | 2.7 |

*Not representative of the invention for stable emulsion blends

EXAMPLE 83

Stabilization of Lower Charge Microemulsion Blends By Adding Urea

Blends are prepared by adding the indicated amounts of the macroemulsion of Example 18, the microemulsion of Example 8 and a 50% urea solution with stirring. The overall total charge of the emulsion blend has a 24% cationic functionality, based on the monomer. The blends are then aged at 50° C. for the indicated time periods. As indicated by the SV measurements, the urea is sufficient to stabilize the blends containing the lower charged quaternized Mannich PAM.

TABLE 9

| Example | Macroemulsion of Example 18 (grams) | Microemulsion of Example 8 (grams) | Urea 50% soln. (grams) | Urea[1] Content (wt. %) | Days at 50° C. | SV (cps) |
|---|---|---|---|---|---|---|
| 83 | 22.0 plus 0.5 g ethoxylated alcohol - 60% EO | 22.5 | 5.0 | 5.0 | 0 | 2.9 |
| | | | | | 1 | 2.9 |
| | | | | | 4 | 2.8 |
| | | | | | 8 | 2.0 |

[1]Urea added to blend (wt % based on emulsion blend)

EXAMPLES 84–87

Stabilization of the Macroemulsion of Example 18

The effectiveness of the aldehyde scavenger can be predicted using the following test. To the macroemulsion of Example 18 is added either: a) a compound (formaldehyde or glyoxal), capable of affecting the ability of the (alk) acrylamide-based polymer to achieve a flocculation effective viscosity in water, or b) the formaldehyde or glyoxal compound in (a) plus an aldehyde scavenger (urea). The mixtures are then heated for a period of time, inverted and their standard viscosities are measured. The results indicate that an aldehyde scavenger is capable of stabilizing formulations containing (alk)acrylamide-based polymer and formaldehyde or glyoxal. Since glyoxalated (alk)acrylamide microemulsions contain or generate glyoxal, an aldehyde scavenger would stabilize a blend of at least one microemulsion containing glyoxalated (alk)acrylamide polymer and at least one second emulsion containing an (alk)acrylamide-based polymer.

TABLE 10

| Example | Active Species | Aldehyde Concentration (ppm based on polymer) | Stabilzer | Urea Concentration (wt. % based on emulsion) | Days @ 50° C. | SV (cps) |
|---|---|---|---|---|---|---|
| 84* | Formaldehyde | 620 | None | — | 0 | 3.9 |
| | | | | | 3 | 1.7 |
| 85 | Formaldehyde | 620 | Urea | 5 | 0 | 3.9 |
| | | | | | 3 | 3.8 |
| 86* | Glyoxal | 1350 | None | — | 0 | 4.2 |
| | | | | | 1 | 1.6 |
| 87 | Glyoxal | 1350 | Urea | 5 | 0 | 3.9 |
| | | | | | 1 | 4.2 |

*Not representative of the invention for stable emulsion blends

EXAMPLE 88

Stabilization of Blends of the Microemulsion of Example 4

A stabilized blend is prepared by mixing 50 g of the microemulsion of Example 4, 50 g of the macroemulsion of Example 18 and log of a 50% urea solution. The blend is allowed to age at room temperature for one month. The blend is inverted and the SV was 2.6 cps at a solution pH of 7. This is essentially unchanged from the SV of the blend when prepared and illustrates that urea is effective at stabilizing blends of the non-heat-treated microemulsion of Example 4.

EXAMPLES 89–93

Stabilization of blends by addition of dimedone

Blends having an overall cationic charge of 40% (mole percent, based on monomer) were prepared from 66.58 g of the microemulsion of Example 5 and 35.64 g of the macroemulsion of Example 18. For the samples containing dimedone, the appropriate amount of dimedone is added to the macroemulsion with stirring. The microemulsion was then added to this mixture with stirring to yield a stabilized blend. The resulting blends are stored at 50° C. for the indicated time period. Samples of the blends are withdrawn and the SV of the blend is measured. The results indicated that dimedone (5,5-dimethyl-1,3-cyclohexyldione) is also effective at stabilizing the emulsion blends.

TABLE 11

| Example | Dimedone[1] (wt. %) | Days @ 50° C. | SV |
|---|---|---|---|
| 89* | 0 | 0 | 2.8 |
| | | 1 | 1.9 |
| | | 4 | 1.9 |
| 90 | 1.25 | 0 | 2.6 |
| | | 1 | 2.6 |
| | | 4 | 2.6 |
| | | 6 | 3.0 |
| | | 8 | 2.5 |
| | | 14 | 2.4 |
| 91 | 2.50 | 0 | 2.4 |
| | | 1 | 2.4 |
| | | 4 | 2.4 |
| | | 6 | 2.6 |
| | | 8 | 2.5 |
| | | 10 | 2.5 |
| | | 12 | 2.4 |
| | | 16 | 2.4 |
| 92 | 3.75 | 0 | 2.6 |
| | | 1 | 2.7 |
| | | 4 | 2.5 |
| | | 6 | 2.7 |
| | | 8 | 2.7 |
| | | 16 | 2.3 |
| 93 | 5.0 | 0 | 3.0 |
| | | 1 | 3.1 |

TABLE 11-continued

| Example | Dimedone[1] (wt. %) | Days @ 50° C. | SV |
|---|---|---|---|
| | | 4 | 3.0 |
| | | 6 | 3.1 |

[1]Dimedone added to macroemulsion (wt % based on emulsion blend)
*Not representative of the invention for stable emulsion blends

MULTIMODAL EMULSION BLEND VISCOSITY DATA

Examples 94–111 demonstrate that the instant process for preparing multimodal emulsions can conveniently provide for emulsion blends that display bulk viscosities that are lower than a weighted average of the two parent emulsions.

EXAMPLE 94

Blends of the microemulsion of Example 5 containing a quaternary Mannich microemulsion and the low charge cationic macroemulsion of Example 18 were prepared. The blends have a lower viscosity than either the macroemulsion or microemulsion.

TABLE 12

| wt. % microemulsion in blend | Bulk Viscosity (cps)² |
|---|---|
| 0¹* | 1740 |
| 10 | 1040 |
| 20 | 835 |
| 30 | 678 |
| 40 | 581 |
| 50 | 511 |
| 60 | 496 |
| 70 | 564 |
| 80 | 755 |
| 90 | 1090 |
| 100* | 2100 |

¹(100 wt % macroemulsion)
²measured using a Brookfield Viscometer LVT model #2 spindle, 12 rpm
*Not representative of the invention of preparing multimodal emulsion blends

EXAMPLES 95–111

Blends Viscosity vs. Composition

A variety of blends of different inverse microemulsions and inverse macroemulsions are prepared. The polymer combinations include cationic/cationic, cationic/anionic and anionic/anionic polymer blends. Table 13 shows examples of these types of blends and the viscosity of the blends measured in centipoise at room temperature using a Brookfield viscometer using a #2 spindle and 12 rpm. The resulting blends are multimodal and advantageous in that they display a viscosity which is lower than that of a weighted average of the two parent inverse emulsions used to prepare the multimodal emulsion blends.

TABLE 13

| | Blend Type | | Weight Percent Microemulsion in the Blend | | | | |
|---|---|---|---|---|---|---|---|
| | Micro | Macro | (viscosity – cps) | | | | |
| Example | emulsion of Example | emulsion of Example | 100%* | 75% | 50% | 25% | 0* (100% macroemulsion) |
| 95 | 9 | 21 | 28 | 55 | 177 | 433 | 960 |
| 96 | 9 | 25 | 28 | 53 | 190 | 461 | 1380 |
| 97 | 9 | 22 | 28 | 65 | 259 | 615 | 4530 |
| 98 | 9 | 23 | 28 | 55 | 242 | 621 | 1650 |
| 99 | 9 | 24 | 28 | 53 | 197 | 504 | 1220 |
| 100 | 10 | 23 | 25 | 68 | 245 | 574 | 1650 |
| 101 | 10 | 21 | 25 | 43 | 98 | 292 | 960 |
| 102 | 10 | 22 | 25 | 70 | 329 | — | 4530¹ |
| 103 | 11 | 21 | 15 | 45 | 115 | 329 | 960 |
| 104 | 11 | 22 | 15 | 48 | 185 | 486 | 4530 |
| 105 | 12 | 21 | 15 | 60 | 234 | 539 | 960 |
| 106 | 5 | 25 | 2300 | 626 | 417 | 611 | 1380 |
| 107 | 5 | 22 | 2300 | 386 | 361 | 585 | 4530 |
| 108 | 5 | 19 | 2300 | 822 | 628 | 698 | 1100 |
| 109 | 5 | 23 | 2300 | 768 | 523 | 748 | 1650 |
| 110 | 5 | 20 | 2300 | 346 | 372 | 561 | 1070 |
| 111 | 5 | 24 | 2300 | 1010 | 625 | 748 | 1220 |

¹#3 spindle used
*Not representative of the invention or preparing multimodal emulsion blends

EXAMPLE 111A

Low Viscosity Emulsion Blend of two microemulsions

The microemulsion of Example 1 having a volume average droplet diameter of 650 Å, (as measured by transmission electron microscopy) and the microemulsion of Example 5 having a volume average droplet diameter of about 1000 Å are blended together as indicated below. The resulting blend is a multimodal emulsion blend which has a viscosity which is less than that predicted by a weighted average of the starting emulsion viscosities.

TABLE 14

| Blend Composition (wt. %) | | Blend Viscosity |
|---|---|---|
| Ex. 1 | Ex. 5 | ¹(cps) |
| 100 | 0 | 28 |
| 75 | 25 | 45 |
| 50 | 50 | 78 |
| 25 | 75 | 249 |
| 0 | 100 | 1260 |

¹Brookfield Viscometer, LVT model with UL adapter 12 rpm

Examples 112–118 demonstrate the performance utility of various stable multimodal emulsion blends.

EXAMPLES 112-188

The efficiency of dewatering a typical municipal sludge is determined in Examples 112-118 as follows: 200 gms of sludge are carefully weighed into a beaker. Aqueous solutions of the polymers and blends are prepared by adding the polymer emulsion sample to water so that the polymer concentration is 0.2 weight percent. Various doses of the polymer solution are added to the sludge samples, water is added to bring the total weight to 250 gms, the mixture is agitated at 1000 rpm for 5 seconds and the resulting flocculated sludge is poured through a Buchner funnel containing a 60 mesh screen. The free drainage is measured by recording the volume of filtrate collected in 10 seconds. The resulting flocculated sludge is further dewatered by pressing the sample under identical conditions. The pressed sludge is then dried to constant weight to determine the final sludge solids content, i.e. the cake solids.

As demonstrated by the data in Examples 112-118, the stable multimodal emulsion blends of Examples 114, 115, 116 and 117 exhibited improved flocculation performance compared to single macroemulsions containing polymers of similar charge.

EXAMPLE 112

Performance of 55% Charge Blends on Typical Municipal Sludge #2

TABLE 15

| Blend of Example | Control of Example | Dose (mL) | Filtrate (mL) | Cake Solids (%) |
|---|---|---|---|---|
| 30 | | 10 | 130 | 27.3 |
| | | 12 | 148 | 29.7 |
| | | 14 | 158 | 28.7 |
| | | 16 | 165 | 30.1 |
| | 15* | 10 | 140 | 28.4 |
| | | 12 | 152 | 30.8 |
| | | 14 | 148 | 28.6 |
| | | 16 | 150 | 27.1 |

*Not representative of the invention for preparing multimodal emulsion blends or the invention for stable emulsion blends

EXAMPLE 113

Performance of 55% Charge Blends on Typical Municipal Sludge #3

TABLE 16

| Blend Example | Control of Example | Dose (mL) | Filtrate (mL) | Cake Solids (%) |
|---|---|---|---|---|
| 30 | | 16 | 103 | 19.8 |
| | | 18 | 135 | 20.3 |
| | | 19 | 135 | 20.4 |
| | | 20 | 147 | 19.0 |
| | | 22 | 148 | 19.2 |
| 27 | | 16 | 128 | 19.1 |
| | | 18 | 143 | 18.9 |
| | | 20 | 137 | 19.6 |
| 33 | | 18 | 74 | 19.7 |
| | | 22 | 126 | 20.4 |
| | | 24 | 137 | 21.1 |
| | 15* | 16 | 68 | 19.6 |
| | | 18 | 141 | 19.2 |
| | | 20 | 152 | 18.6 |
| | | 22 | 151 | 18.4 |

*Not representative of the invention for preparing multimodal emulsion blends or the invention for stable emulsion blends

EXAMPLE 114

Performance of 20% Charge Blends on Typical Paper Sludge

Tested with an agitation 500 rpm for 5 seconds. Filtrate quality is assessed by measuring clarity, in NTU with a Hach turbidimeter.

TABLE 17

| Blend Example | Control of Example | Dose (mL) | Filtrate (mL) | Turbidity (NTU) |
|---|---|---|---|---|
| 44 | | 9 | 106 | 141 |
| | | 12 | 126 | 38 |
| | | 15 | 122 | 76 |
| | | 18 | 124 | 50 |
| 45 | | 9 | 114 | 180 |
| | | 12 | 140 | 44 |
| | | 15 | 142 | 33 |
| | | 18 | 148 | 44 |
| 46 | | 9 | 118 | 191 |
| | | 12 | 138 | 40 |
| | | 15 | 148 | 30 |
| | | 18 | 138 | 43 |
| 49 | | 9 | 100 | 294 |
| | | 12 | 134 | 54 |
| | | 15 | 148 | 35 |
| | | 18 | 146 | 44 |
| | 13* | 9 | 50 | >500 |
| | | 12 | 102 | 164 |
| | | 15 | 138 | 83 |
| | | 18 | 144 | 47 |

*Not representative of the invention for preparing multimodal emulsion blends or the invention for stable emulsion blends

EXAMPLE 115

Performance of 55% Charge Blends on Municipal Sludge #4

TABLE 18

| Blend of Example | Control of Example | Dose (mL) | Filtrate (mL) | Cake Solids (%) |
|---|---|---|---|---|
| 30 | | 12 | 92 | 24 |
| | | 14 | 136 | 22 |
| | | 16 | 150 | 22 |
| | | 18 | 148 | 23 |
| | 15* | 12 | 72 | 24 |
| | | 14 | 104 | 24 |
| | | 16 | 125 | 27 |
| | | 18 | 148 | 23 |

*Not representative of the invention for preparing multimodal emulsion blends or the invention for stable emulsion blends

EXAMPLE 116

Performance of 55% Charge Blends on Municipal Sludge #5

TABLE 19

| Blend of Example | Control of Example | Dose (mL) | Filtrate (mL) | Cake Solids (%) |
|---|---|---|---|---|
| 30 | | 18 | 84 | 17 |
| | | 20 | 116 | 16 |
| | | 22 | 127 | 16 |
| | | 24 | 110 | 17 |
| | 15* | 18 | 98 | 16 |
| | | 20 | 108 | 17 |
| | | 22 | 104 | 16 |
| | | 24 | 106 | 17 |

*Not representative of the invention for preparing multimodal emulsion blends or the invention for stable emulsion blends

EXAMPLE 117

Performance of 20% Charge Blends on Municipal Sludge #6

TABLE 20

| Blend of Example | Control of Example | Dose (mL) | Filtrate (mL) | Turbidity (NTU) |
|---|---|---|---|---|
| 44 | | 5 | 56 | 765 |
| | | 6 | 74 | 432 |
| | | 7 | 76 | 284 |
| | | 8 | 88 | 183 |
| | | 9 | 88 | 110 |
| | | 10 | 90 | 111 |
| | | 12 | 88 | 98 |
| 45 | | 5 | 50 | >1000 |
| | | 6 | 58 | 678 |
| | | 7 | 56 | 440 |
| | | 8 | 66 | 309 |
| | | 9 | 70 | 256 |
| | | 10 | 84 | 159 |
| | | 12 | 106 | 98 |
| | | 14 | 94 | 112 |
| | 13* | 5 | 54 | >1000 |
| | | 6 | 66 | 581 |
| | | 7 | 72 | 363 |
| | | 8 | 88 | 210 |
| | | 9 | 100 | 123 |
| | | 10 | 94 | 83 |
| | | 12 | 100 | 43 |

*Not representative of the invention for preparing multimodal emulsion blends or the invention for stable emulsion blends

EXAMPLE 118

Preparation And Performance Of Blends

Blends in Example 110 are prepared by mixing the emulsion of Examples 5 and 20, then stabilized by urea at a level of 1.5–2.0%, and tested using typical sludge #7. Example 110 and 30 blends show effective performance comparable to the emulsions used to prepare the emulsion blend 110.

TABLE 21

| Blend Example | Control of Example | Dose (mL) | Filtrate (mL) | Turbidity (NTU) |
|---|---|---|---|---|
| 110 | | 8 | 88 | — |
| Micro/Macro = 1/1 g/g | | 10 | 125 | 22 |
| | | 12 | 129 | 22 |
| | | 14 | 120 | — |
| 110 | | 8 | 87 | — |
| Micro/Macro = 1/3 g/g | | 10 | 125 | 20 |
| | | 12 | 135 | 22 |
| | | 13 | 124 | 22 |
| | | 14 | 133 | — |
| 30 | | 8 | 77 | — |
| | | 10 | 125 | 22 |
| | | 12 | 131 | 23 |
| | | 14 | 129 | 24 |
| | 5* | 8 | 82 | — |
| | | 10 | 124 | 22 |
| | | 12 | 136 | 22 |
| | | 14 | 121 | 21 |
| | | 16 | 120 | 21 |
| | | 18 | 105 | 20 |
| | 20* | 8 | 77 | — |
| | | 10 | 121 | 21 |
| | | 12 | 132 | 23 |
| | | 14 | 117 | — |

*Not representative of the invention for preparing multimodal emulsion blends or the invention for stable emulsion blends The preceding examples can be repeated with similar results by substituting the generically or specifically described reactions and/or operating conditions of this invention for those used in the preceding examples.

From the foregoing description, one skilled in the art can easily ascertain the essential characteristics of this invention and without departing from the spirit or scope of the invention, can make various modifications of the invention to adapt it to various applications.

We claim:

1. A stable composition comprising a blend of at least two inverse emulsions wherein:

(a) at least one of said two emulsions is an inverse microemulsion which contains in its discontinuous phase an (alk)acrylamide functionalized water-swellable or water-soluble polymer; wherein said microemulsion contains or said functionalized polymer contains, or generates an aldehyde and said microemulsion comprises surfactant having a total hydrophilic-lipophilic balance of from about 8 to about 12 and having total concentration of from about 8% to about 25% by weight based on said microemulsion; and (b) the second of said two emulsions in said blend contains a water-swellable or water-soluble (alk)acrylamide polymer which is different than said functionalized polymer and a blend stabilizing amount of aldehyde scavenger.

2. A composition as defined in claim 1 wherein said (alk)acrylamide polymer (a) or (b) is a cationic polymer containing monomeric units selected from: quaternary dialkyl aminomethyl(alk)acrylamide; dialkyl aminomethyl (alk)acrylamide; quaternary dialkylaminoalkyl (meth) acrylamides; and dialkylaminoalkyl (meth)acrylamide or a copolymer of acrylamide or methacrylamide with any of the aforesaid monomeric units or a monomeric unit selected from quaternary dialkylaminoalkyl (meth)acrylates; dialkylaminoalkyl (meth)acrylates and diallyldialkylammonium halides.

3. A composition as defined in claim 1 wherein said functionalized polymer is a dialkyl aminomethyl (alk) acrylamide polymer or quarternary derivative thereof.

4. A composition as defined in claim 1 wherein said functionalized polymer is water-soluble and said (alk) acrylamide polymer (b) is water-soluble.

5. A composition as defined in claim 1 wherein the second emulsion is a macroemulsion.

6. A composition as defined in claim 1 wherein the aldehyde scavenger is a formaldehyde scavenger selected from urea, dimedone; sodium metabisulfite and sodium bisulfite.

7. A composition as defined in claim 1 wherein the blend stabilizing amount of aldehyde scavenger ranges from about 0.1 to about 10.0 weight percent based on the weight of the stable composition.

8. A composition as defined in claim 1 wherein the blend stabilizing amount of aldehyde scavenger ranges from about 0.7 to about 5.0 weight percent based on the weight of the stable composition.

9. A composition as defined in claim 1 comprising one microemulsion and one second emulsion.

10. A composition as defined in claim 1 which contains an aldehyde compound selected from formaldehyde, acetaldehyde and glyoxal.

11. A composition as defined in claim 1 wherein the ratio of microemulsion to second emulsion ranges from about 95:5 parts microemulsion to second emulsion to about 5:95 parts microemulsion to second emulsion.

12. A stable composition comprising a blend of at least two inverse emulsions wherein:

(a) at least one of said two emulsions is an inverse microemulsion which contains in its discontinuous phase a water-soluble dialkyl aminomethyl (alk) acrylamide polymer or quaternized product thereof; wherein said microemulsion contains or dialkyl aminomethyl (alk)acrylamide polymer contains, or generates an aldehyde and said microemulsion comprises surfactant having a total hydrophilic-lipophilic balance of from about 8 to about 12 and having total concentration of from about 8% to about 25% by weight based on said microemulsion; and (b) the second of said two emulsions in said blend contains a water-swellable or water-soluble (alk) acrylamide polymer which is different than said functionalized polymer and a blend stabilizing amount of aldehyde scavenger.

13. A composition as defined in claim 12 wherein said microemulsion contains a quaternary dialkyl aminomethyl (alk)acrylamide and said second emulsion contains a water-soluble (alk)acrylamide polymer.

14. A composition as defined in claim 12 wherein the second emulsion is a macroemulsion.

15. A composition as defined in claim 12 wherein the aldehyde scavenger is a formaldehyde scavenger selected from urea, dimedone, sodium metabisulfite and sodium bisulfite.

16. A composition as defined in claim 12 wherein the blend stabilizing amount of aldehyde scavenger ranges from about 0.1 to about 10.0 weight percent based on the weight of the stable composition.

17. A composition as defined in claim 12 wherein the blend stabilizing amount of aldehyde scavenger ranges from about 0.7 to about 5.0 weight percent based on the weight of the stable composition.

18. A composition as defined in claim 12 wherein said (alk)acrylamide polymer (b) is a cationic polymer containing monomeric units selected from: quaternary dialkyl aminomethyl(alk)acrylamide; dialkyl aminomethyl (alk) acrylamide; quaternary dialkylaminoalkyl (meth) acrylamides; and dialkylaminoalkyl (meth)acrylamide or a copolymer of acrylamide or methacrylamide with any of the aforesaid monomeric units or a monomeric unit selected from quaternary dialkylaminoalkyl (meth)acrylates; dialkylaminoalkyl (meth)acrylates and diallyldialkylammonium halides.

19. A composition as defined in claim 18 wherein the second emulsion is a macroemulsion.

20. A composition as defined in claim 18 wherein the aldehyde scavenger is a formaldehyde scavenger selected from urea, dimedone, sodium metabisulfite and sodium bisulfite.

21. A composition as defined in claim 18 wherein the blend stabilizing amount of aldehyde scavenger ranges from about 0.1 to about 10.0 weight percent based on the weight of the stable composition.

22. A composition as defined in claim 18 wherein said microemulsion contains a dialkyl aminomethyl (alk) acrylamide polymer or quaternized product thereof containing from about 20 to about 100 mole percent cationic functionality, and said second emulsion contains a cationic (alk)acrylamide polymer containing from about 1 to about 60 mole percent cationic functionality.

23. A composition as defined in claim 18 wherein said (alk)acrylamide polymer is a copolymer of acrylamide and (meth)acryloxethyltrimethylammonium salt.

24. A composition as defined in claim 23 wherein the second emulsion is a macroemulsion.

25. A composition as defined in claim 23 wherein the aldehyde scavenger is a formaldehyde scavenger selected from urea, dimedone, sodium metabisulfite and sodium bisulfite.

26. A composition as defined in claim 23 wherein the blend stabilizing amount of aldehyde scavenger ranges from about 0.1 to about 10.0 weight percent based on the weight of the stable composition.

27. A stable composition comprising a blend of at least two inverse emulsions wherein:

(a) at least one at said two emulsions is an inverse microemulsion which contains in its discontinuous phase a water-soluble quaternary dialkyl aminomethyl (alk)acrylamide polymer; wherein said microemulsion or contains dialkyl aminomethyl (alk)acrylamide polymer contains, or generates an aldehyde and said microemulsion comprises surfactant having a total hydrophilic-lipophilic balance of from about 0 to about 12 and having total concentration from about 8% to about 25% by weight based on said microemulsion; and (b) the second of said two emulsions in said blend is a macroemulsion which contains in its discontinuous phase a water-soluble copolymer of acrylamide and (meth)acryloxethyltrimethylammonium salt and from about 0.1 to about 10.0 weight percent, based on the stable composition, of formaldehyde scavenger selected from urea, dimethylcyclohexyldione, sodium metabisulfite and sodium bisulfite.

28. A composition as defined in claim 27 wherein said quaternary dialkyl aminomethyl (alk)acrylamide polymer contains from about 20 to about 100 mole percent cationic functionality, and said copolymer of (alk)acrylamide and (meth)acryloyloxyethyltrimethylammonium salt contain from about 1 to about 60 mole percent cationic functionality.

29. A composition as defined in claim 27 wherein said quaternary dialkyl aminomethyl (alk)acrylamide polymer contains from about 60 to about 90 mole percent cationic functionality, and said copolymer of (alk)acrylamide and (meth)acryloyloxyethyltrimethylammonium salts contains from about 1 to about 20 mole percent cationic functionality.

30. A method of preparing a stable composition comprising a blend of at least two inverse emulsions which comprises:

(a) preparing an inverse microemulsion comprising a water-soluble or water-soluble (alk)acrylamide functionalized polymer; wherein said microemulsion contains or functionalized polymer contains, or generates aldehyde and said microemulsion comprises surfactant having a total hydrophilic-lipophilic balance of from about 8 to about 12 and having total concentration from about 8% to about 25% by weight based on said microemulsion;

(b) preparing a second emulsion comprising a water-swellable or water-soluble (alk)acrylamide polymer which is different than said functionalized polymer;

(c) admixing said microemulsion and said second emulsion to form a blend of emulsions; and (d) adding a blend stabilizing amount of aldehyde scavenger compound to the emulsion blend resulting from step (c).

31. A method of preparing a stable composition comprising a blend of at least two inverse emulsions which comprises:

(a) preparing an inverse microemulsion comprising a water-swellable or water-soluble (alk)acrylamide functionalized polymer; wherein said microemulsion contains or said functionalized polymer contains, or generates aldehyde and said microemulsion comprises surfactant having a total hydrophilic-lipophilic balance of from about 8 to about 12 and having total concentration from about 8% to about 25% by weight based on said microemulsion;

(b) preparing a second emulsion comprising a water-swellable or water-soluble (alk)acrylamide polymer which is different than said functionalized polymer and a blend stabilizing amount of aldehyde scavenger compound; and (c) admixing said microemulsion and said second emulsion.

32. A method of preparing an inverse stable composition comprising a blend of at least two inverse emulsions which comprises:

(a) preparing an inverse microemulsion comprising a water-swellable or water-soluble (alk)acrylamide functionalized polymer; wherein said microemulsion contains or said functionalized polymer contains, or generates aldehyde and said microemulsion comprises surfactant having a total hydrophilic-lipophilic balance of from about 8 to about 12 and having total concentration from about 8% to about 25% by weight based on said microemulsion;

(b) preparing a second emulsion comprising a water-swellable or water-soluble (alk)acrylamide polymer which is different than said functionalized polymer;

(c) adding a blend stabilizing amount of aldehyde scavenger compound to said microemulsion resulting from step (a) or to said second emulsion in step (b);

(d) admixing said microemulsion resulting from step (c) and said second emulsion.

33. A method of preparing a stable composition according to claim 30, 31 or 32 wherein said functionalized polymer is a water-soluble dialkyl aminomethyl (alk)acrylamide polymer or a quaternized product thereof and said second emulsion is a macroemulsion.

* * * * *